US012764062B2

(12) United States Patent
Charif et al.

(10) Patent No.: US 12,764,062 B2
(45) Date of Patent: Oct. 13, 2026

(54) SYSTEM AND METHOD FOR DETERMINISTIC AND INCREMENTAL PHYSICALLY-AWARE NETWORK-ON-CHIP GENERATION

(71) Applicant: ARTERIS, INC., Campbell, CA (US)

(72) Inventors: Amir Charif, Paris (FR); Xavier Van Ruymbeke, Clamart (FR)

( * ) Notice: Subject to any disclaimer, the term of this patent is extended or adjusted under 35 U.S.C. 154(b) by 832 days.

(21) Appl. No.: 18/155,729

(22) Filed: Jan. 17, 2023

(65) Prior Publication Data

US 2024/0243994 A1 Jul. 18, 2024

(51) Int. Cl.

| | |
|---|---|
| ***G06F 30/394*** | (2020.01) |
| ***G06F 115/02*** | (2020.01) |
| ***H04L 45/02*** | (2022.01) |
| ***H04L 45/28*** | (2022.01) |
| ***H04L 49/1515*** | (2022.01) |

(52) U.S. Cl.

CPC .............. *H04L 45/28* (2013.01); *H04L 45/02* (2013.01)

(58) Field of Classification Search

CPC ....... H04L 45/28; H04L 45/02; H04L 49/109; H04L 41/12; H04L 45/24; H04L 49/1515; H04L 49/252; G06F 2111/04; G06F 30/392; G06F 2115/02; G06F 2119/20; G06F 30/3323; G06F 30/394; G06F 30/327; G06F 30/398; G06F 15/7807

See application file for complete search history.

(56) References Cited

U.S. PATENT DOCUMENTS

| | | | |
|---|---|---|---|
| 5,485,396 | A | 1/1996 | Brasen et al. |
| 5,541,849 | A | 7/1996 | Rostoker et al. |
| 5,623,420 | A | 4/1997 | Yee et al. |
| 5,638,288 | A | 6/1997 | Deeley |
| 5,761,078 | A | 6/1998 | Fuller et al. |
| 5,887,670 | A | 3/1999 | Tabata et al. |
| 5,903,886 | A | 5/1999 | Heimlich et al. |
| 5,983,277 | A | 11/1999 | Heile et al. |
| 6,002,857 | A | 12/1999 | Ramachandran |
| 6,134,705 | A | 10/2000 | Pedersen et al. |
| 6,145,117 | A | 11/2000 | Eng |

(Continued)

FOREIGN PATENT DOCUMENTS

| | | |
|---|---|---|
| CN | 105187313 B | 5/2018 |
| CN | 109587081 A | 4/2019 |

(Continued)

OTHER PUBLICATIONS

U.S. Appl. No. 17/134,384, filed Dec. 26, 2020, Federico Angiolini.

(Continued)

*Primary Examiner* — Nghia M Doan

(74) *Attorney, Agent, or Firm* — Dana Legal Services; Jubin Dana

(57) ABSTRACT

System and methods are disclosed for generation and synthesis of networks, such as a network-on-chip (NoC), to generate a network description. The system generates a NoC from a set of physical constraints and performance constraints as well as a set of inputs to a sequencer. The system produces the NoC with all its elements. The resulting output includes placement of the elements on a floorplan of a chip that represents the network, such as the NoC.

5 Claims, 24 Drawing Sheets

(56) References Cited

U.S. PATENT DOCUMENTS

| | | | |
|---|---|---|---|
| 6,249,902 | B1 | 6/2001 | Igusa et al. |
| 6,321,363 | B1 | 11/2001 | Huang et al. |
| 6,360,356 | B1 | 3/2002 | Eng |
| 6,378,121 | B2 | 4/2002 | Hiraga |
| 6,421,321 | B1 | 7/2002 | Sakagawa et al. |
| 6,437,804 | B1 | 8/2002 | Ibe et al. |
| 6,449,761 | B1 | 9/2002 | Greidinger et al. |
| 6,622,225 | B1 | 9/2003 | Kessler et al. |
| 6,883,455 | B2 | 4/2005 | Maeda et al. |
| 6,907,591 | B1 | 6/2005 | Teig et al. |
| 7,096,436 | B2 | 8/2006 | Bednar et al. |
| 7,398,497 | B2 | 7/2008 | Sato et al. |
| 7,587,687 | B2 | 9/2009 | Watanabe et al. |
| 7,788,625 | B1 | 8/2010 | Donlin et al. |
| 8,042,087 | B2 | 10/2011 | Murali et al. |
| 8,302,041 | B1 | 10/2012 | Chan et al. |
| 8,819,611 | B2 | 8/2014 | Philip et al. |
| 9,184,998 | B2 | 11/2015 | Xue |
| 9,262,359 | B1 | 2/2016 | Noice et al. |
| 9,444,702 | B1 | 9/2016 | Raponi et al. |
| 9,569,574 | B1 | 2/2017 | Khan et al. |
| 9,792,397 | B1 | 10/2017 | Nagaraja |
| 9,825,779 | B2 | 11/2017 | Ruymbeke et al. |
| 9,940,423 | B2 | 4/2018 | Lescure |
| 10,068,047 | B1 | 9/2018 | Finn |
| 10,282,502 | B1 | 5/2019 | BShara et al. |
| 10,348,563 | B2 | 7/2019 | Rao et al. |
| 10,460,062 | B2 | 10/2019 | Feld et al. |
| 10,733,350 | B1 | 8/2020 | Prasad et al. |
| 10,853,545 | B1 | 12/2020 | Nardi et al. |
| 10,922,471 | B2 | 2/2021 | Baeckler et al. |
| 10,990,724 | B1 | 4/2021 | Cherif et al. |
| 11,121,933 | B2 | 9/2021 | Cherif et al. |
| 11,281,827 | B1 | 3/2022 | Labib et al. |
| 11,449,655 | B2 | 9/2022 | Cherif et al. |
| 2003/0093765 | A1 | 5/2003 | Lam et al. |
| 2004/0040007 | A1 | 2/2004 | Harn |
| 2004/0230919 | A1 | 11/2004 | Balasubramanian et al. |
| 2005/0073316 | A1 | 4/2005 | Graham |
| 2005/0268258 | A1 | 12/2005 | Decker |
| 2007/0156378 | A1 | 7/2007 | McNamara |
| 2007/0157131 | A1 | 7/2007 | Watanabe et al. |
| 2007/0174795 | A1 | 7/2007 | Lavagno et al. |
| 2007/0186018 | A1 | 8/2007 | Radulescu et al. |
| 2008/0046854 | A1 | 2/2008 | Tang |
| 2008/0049753 | A1 | 2/2008 | Heinze et al. |
| 2008/0279183 | A1 | 11/2008 | Wiley et al. |
| 2008/0291826 | A1 | 11/2008 | Licardie et al. |
| 2009/0031277 | A1 | 1/2009 | Mcelvain et al. |
| 2009/0313592 | A1 | 12/2009 | Murali et al. |
| 2010/0061352 | A1 | 3/2010 | Fasolo et al. |
| 2010/0162189 | A1 | 6/2010 | Lavagno et al. |
| 2010/0218146 | A1 | 8/2010 | Platzker et al. |
| 2010/0274785 | A1 | 10/2010 | Procopiuc et al. |
| 2011/0170406 | A1 | 7/2011 | Krishnaswamy |
| 2012/0013509 | A1 | 1/2012 | Wisherd et al. |
| 2012/0311512 | A1 | 12/2012 | Michel et al. |
| 2013/0174113 | A1 | 7/2013 | Lecler et al. |
| 2013/0208598 | A1 | 8/2013 | Nakaya et al. |
| 2013/0258847 | A1 | 10/2013 | Zhang et al. |
| 2013/0283226 | A1 | 10/2013 | Ho et al. |
| 2013/0308444 | A1* | 11/2013 | Sem-Jacobsen ...... H04L 47/125 370/242 |
| 2014/0115218 | A1 | 4/2014 | Philip et al. |
| 2014/0126572 | A1 | 5/2014 | Hutton et al. |
| 2014/0153575 | A1 | 6/2014 | Munoz |
| 2014/0156826 | A1 | 6/2014 | Chang et al. |
| 2014/0160939 | A1 | 6/2014 | Arad et al. |
| 2014/0169173 | A1 | 6/2014 | Naouri et al. |
| 2014/0204735 | A1 | 7/2014 | Kumar et al. |
| 2014/0211622 | A1 | 7/2014 | Kumar et al. |
| 2014/0298281 | A1 | 10/2014 | Varadarajan et al. |
| 2014/0321839 | A1 | 10/2014 | Armstrong |
| 2015/0036536 | A1 | 2/2015 | Kumar et al. |
| 2015/0106778 | A1 | 4/2015 | Mangano et al. |
| 2015/0121319 | A1 | 4/2015 | Hutton et al. |
| 2015/0178435 | A1 | 6/2015 | Kumar |
| 2015/0254325 | A1 | 9/2015 | Stringham |
| 2015/0341224 | A1 | 11/2015 | Van et al. |
| 2015/0347641 | A1 | 12/2015 | Gristede et al. |
| 2016/0103943 | A1 | 4/2016 | Xia et al. |
| 2016/0275213 | A1 | 9/2016 | Tomita |
| 2016/0321390 | A1 | 11/2016 | Bozman et al. |
| 2017/0060204 | A1 | 3/2017 | Gangwar et al. |
| 2017/0063734 | A1 | 3/2017 | Kumar |
| 2017/0132350 | A1 | 5/2017 | Janac |
| 2017/0177778 | A1 | 6/2017 | Lescure |
| 2017/0193136 | A1 | 7/2017 | Prasad et al. |
| 2018/0115487 | A1 | 4/2018 | Thubert et al. |
| 2018/0144071 | A1 | 5/2018 | Yu et al. |
| 2018/0227180 | A1 | 8/2018 | Rao et al. |
| 2019/0012909 | A1 | 1/2019 | Mintz |
| 2019/0020586 | A1* | 1/2019 | Karanam .............. H04L 49/109 |
| 2019/0073440 | A1 | 3/2019 | Farbiz et al. |
| 2019/0205493 | A1 | 7/2019 | Garibay et al. |
| 2019/0246989 | A1 | 8/2019 | Genov et al. |
| 2019/0251227 | A1 | 8/2019 | Fink |
| 2019/0260504 | A1 | 8/2019 | Philip et al. |
| 2019/0363789 | A1 | 11/2019 | Lee et al. |
| 2020/0092230 | A1 | 3/2020 | Schultz et al. |
| 2020/0162335 | A1 | 5/2020 | Chen et al. |
| 2020/0234582 | A1 | 7/2020 | Mintz |
| 2020/0366607 | A1 | 11/2020 | Kommula et al. |
| 2021/0203557 | A1 | 7/2021 | Cherif et al. |
| 2021/0226887 | A1 | 7/2021 | Mereddy |
| 2021/0320869 | A1* | 10/2021 | Bourai .................. H04L 47/125 |
| 2021/0409284 | A1 | 12/2021 | Cherif et al. |
| 2022/0294704 | A1 | 9/2022 | Lescure et al. |
| 2023/0359801 | A1* | 11/2023 | Venkatakrishnan .. G06F 30/398 |

FOREIGN PATENT DOCUMENTS

| | | | |
|---|---|---|---|
| CN | 113051215 | A | 6/2021 |
| CN | 113055219 | A | 6/2021 |
| DE | 102015014851 | A1 | 5/2016 |
| EP | 3842987 | A1 | 6/2021 |
| EP | 4024262 | A1 | 7/2022 |
| EP | 4057179 | A1 | 9/2022 |

OTHER PUBLICATIONS

U.S. Appl. No. 17/665,578, filed Feb. 6, 2022, K. Charles Janac.

"A distributed interleaving scheme for efficient access to wideIO dram memory", Seiculescu Ciprian, Benini Luca, De Micheli Giovanni, CODES+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conterence Alberto Ghiribaldi, Hervé Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

Alessandro Pinto et al, "System level design paradigms", ACM Transactions on Design Automation of Electronic Systems, ACM, New York, NY, US, (Jun. 7, 2004), vol. 11, No. 3, doi:10.1145/1142980.1142982, ISSN 1084-4309, pp. 537-563, XP058222500.

Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.

Bo Huang et al, "Application-Specific Network-on-Chip synthesis with topology-aware floorplanning", Integrated Circuits and Systems Design (SBCCI), 2012 25th Symposium on, IEEE, (Aug. 30, 2012), doi:10.1109/SBCCI.2012.6344421, ISBN 978-1-4673-2606-3, pp. 1-6, XP032471227.

(56) References Cited

OTHER PUBLICATIONS

David Atienza et al, Network-on-Chip Design and Synthesis Outlook, Science Direct, Integration the VLSI, journal 41 (2008) 340-359.

Dumitriu Vet Al: "Throughput-Oriented Noc Topology Generation and Analysis for High Performance SoCs", IEEE Transactions on Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, Doi: 10.1109/TVLSI.2008.2004592.

Fangfa Fu et al: "A Noc performance evaluation platform supporting designs at multiple levels of abstraction", Industrial Electronics and Applications, 2009. ICIEA 2009. 4th IEEE Conference on, IEEE, Piscataway, NJ, USA, May 25, 2009 (May 25, 2009), pp. 425-429, XP031482069, ISBN: 978-1-4244-2799-4 abstract* * p. 426-p. 429 *.

Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].

Jean-Jacques Lecler et al: Application driven network-on-chip architecture exploration & refinement for a complex SoC, Design Automation for Embedded Systems, vol. 15 No. 2, Apr. 7, 2011, DOI: 10.1007/S10617-011-9075-5.

K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).

Luca Benini: "Application specific Noc design", Design, Automation and Test in Europe, 2006, Date '06 : Mar. 6-10, 2006, [Munich, Germany; Proceedings] / [Sponsored By the European Design and Automation Association], IEEE, Piscataway, NJ, USA, Mar. 6, 2006 (Mar. 6, 2006), pp. 491-495, XP058393584, ISBN: 9783981080100.

Murali et al: "Synthesis of Predictable Networks-on-Chip-Based Interconnect Architectures for Chip Multiprocessors", IEEE Transactions on Very Large Scale Integration (VLSI) Systems, IEEE Service Center, Piscataway, NJ, USA, vol. 15, No. 8, Aug. 1, 2007 (Aug. 1, 2007) , pp. 869-880, XP011187732, ISSN: 1063-8210, DOI: 10.1109/TVLSI.2007.900742.

Partha et al., Design, Synthesis, and Test of Networks on Chips, IEEE (Year: 2005).

Picornell Tomas Tompic@GAP.UPV.ES et al: "DCFNoC A Delayed Conflict-Free Time Division Multiplexing Network on Chip", Designing Interactive Systems Conference, Acm, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.

Srinivasan K et al, "Linear programming based techniques for synthesis of network-on-chip architectures", Computer Design: VLSI in Computers and Processors, 2004. ICCD 2004. Proceedings. IEEE International Conference on San Jose, CA, USA Oct. 11-13, 2004, Piscataway, NJ, USA, IEEE, (Oct. 11, 2004), doi: 10.1109/ICCD.2004.1347957, ISBN 978-0-7695-2231-9, pp. 422-429, XP010736641.

Srinivasan Murali et al: "Mapping and physical planning of networks-on-chip architectures with quality-of-service guarantees", Proceedings of the 2005 Asia and South Pacific Design Automation Conference, Jan. 18, 2005, DOI: 10.1145/1120725.1120737.

Tobias Bjerregaard et al: "A Router Architecture for Connection-Oriented Service Guarantees in the MANGO Clockless Network-on-Chip", Proceedings of the IEEE Conference and Exhibition on Design, Automation, and Test in Europe, Mar. 7, 2005, DOI: 10.1109/DATE.2005.36.

Wei Zhong et al: "Floorplanning and Topology Synthesis for Application-Specific Network-on-Chips", IEICE Transactions on Fundamentals of Electronics< Communications and Computer Sciences, Jun. 1, 2013, DOI: 10.1587/TRANSFUN.E96.A.1174.

Zhou Rongrong et al: A Network Components Insertion Method for 3D Application-Specific Network-on-Chip, Proceedings of the 11th IEEE International Conference on ASIC, Nov. 3, 2015, pp. 1-4, DOI: 10.1109/ASICON.2015.7516952.

Chaari Moomen Moomen Chaari@Infineon Com et al: "A model-based and simulation-assisted FMEDA approach for safety-relevant E/E systems", Proceedings of the 34th ACM SIGMOD-SIGACT-SIGAI Symposium on Principles of Database Systems, ACMPUB27, New York, NY, USA, Jun. 7, 2015 (Jun. 7, 2015), pp. 1-6, XP058511366, DOI: 10.1145/2744769.2747908 ISBN: 978-1-4503-3550-8.

Mariani R et al: "Fault-Robust Microcontrollers for Automotive Applications", On-Line Testing Symposium, 2006. IOLTS 2006. 12th IEEE International Como, Italy Jul. 10-12, 2006, Piscataway, NJ, USA, IEEE, Jul. 10, 2006 (Jul. 10, 2006), pp. 213-218, XP010928275, DOI: 10.1109/IOLTS.2006.38 ISBN: 978-0-7695-2620-1.

Anonymous: "Intel Hyperflex Architecture HighPerformance Design Handbook", Oct. 4, 2021 (Oct. 4, 2021), pp. 1-147, XP093063924, Retrieved from the Internet: URL:https://cdrdv2.intel.com/vl/dl/getContent/667078?fileName=sl0_hp_hb-683353-667078.pdf.

James C. Tiernan. 1970. An efficient search algorithm to find the elementary circuits of a graph. Commun. ACM 13, 12 (Dec. 1970), 722-726. https://doi.org/10.1145/362814.362819.

Ken Eguro et al: "Simultaneous Retiming and Placement for Pipelined Net lists", Proceedings of the 16th International Symposium on Field-Programmable Custom Computing Machines, Apr. 14, 2008 (Apr. 14, 2008), pp. 139-148, XP031379339.

Anonymous: "Network on a chip—Wikipedia", Jun. 15, 2021, https://en.wikipedia.org/w/index.php?title=Network_on_a_chip&oldid=1028654828.

Haytham Elmiligi et al: "Networks-on-chip topology optimization subject to power, delay, and reliability constraints", IEEE International Symposium on Circuits and Systems, May 30, 2010, pp. 2354-2357, DOI: 10.1109/ISCAS 2010.5537194.

Jain R. et al: "Predicting system-level area and delay for pipelined and nonpipelined designs", IEEE Transactions on Computer Aided Design of Integrated Circuits and Systems, vol. 11, No. 8, Jan. 1, 1992, pp. 955-965, DOI: 10.1109/43.149767.

Jingye Xu et al: "Latch Based Interconnect Pipelining for High Speed Integrated Circuits", Proceedings of the International Conference on Electro/Information Technology, May 1, 2006, pp. 295-300, DOI: 10.1109/EIT.2006.252152.

Jun Minje et al: "Exploiting Implementation Diversity and Partial Connection of Routers in Application-Specific Network-on-Chip Topology Synthesis", IEEE Transactions on Computers, IEEE, USA, vol. 63, No., 6, Jun. 1, 2014 (Jun. 1, 2014) pp. 1434-1445, XP011550397, ISSN: 0018-9340, DOI: 10.1109/TC:2012.294.

Saponara S et al: "Design and coverage-driven verification of a novel network-interface IP macrocell for network-on-chip interconnects", Microprocessors and Microsystems, vol. 35, No. 6 , pp. 579-592, XP028255708 ISSN: 0141-9331, DOI: 10.1016/J.MICPRO.2011.06.005.

Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150 XP029678799, ISSN: 0141-9331, DOI: 10.1016/J.MICPRO.2016.04.008.

Song Z et al: "A NOC-Based High Performance Deadlock Avoidance Routing Algorithm", Computer and Computational Sciences, 2008. IMSCCS '08. International Multisymposiums on, IEEE, Piscataway, NJ, USA, Oct. 18, 2008, pp. 140-143, XP031411025, ISBN: 978-0-7695-3430-5.

* cited by examiner

150

400

Slave

Master

| | S1 | S2 | S3 | S4 | S5 |
|---|---|---|---|---|---|
| M1 | L1 | | L1 | L2 | |
| M2 | | L1 | L1 | L2 | L3 |
| M3 | L2 | | | L3 | |

Label (3 labels in this example)

Communication policy flag

| | Latency sensitive | Bandwidth balance | Serialize |
|---|---|---|---|
| L1 | x | | |
| L2 | | | |
| L3 | x | x | |

Communication policy definition for L3: Latency Sensitive + Balanced bandwidth

FIG. 4

500

| | S1 | S2 | S3 |
|---|---|---|---|
| M1 | 100MB/s | 100MB/s | 200MB/s |
| M2 | 500MB/s | X | 1GB/s |

| | S1 | S2 | S3 |
|---|---|---|---|
| M1 | 50MB/s | 50MB/s | 50MB/s |
| M2 | 50MB/s | X | 1GB/s |

No connection between M2 and S2

FIG. 5

- 3 master NIUs
- 5 target NIUs
- 3 traffic class labels:
  - BE
  - LL
  - BW
- Hence 3 main switches
- Connectivity + labels:

| | S1 | S2 | S3 | S4 | S5 |
|---|---|---|---|---|---|
| M1 | BE | | BE | LL | |
| M2 | | BE | BE | LL | BW |
| M3 | LL | | | BW | |

SYSTEM AND METHOD FOR DETERMINISTIC AND INCREMENTAL PHYSICALLY-AWARE NETWORK-ON-CHIP GENERATION

TECHNICAL FIELD

The present technology is in the field of system design and, more specifically, related to topology generation of a network-on-chip (NoC) description.

BACKGROUND

Multiprocessor systems have been implemented in systems-on-chips (SoCs) that communicate through network-on-chips (NoCs). The SoCs include instances of master (initiators) intellectual properties (IPs) and slave (targets) IPs. Transactions, in the form of packets, are sent from a master to one or more slaves using industry-standard protocols. The master, connected to the NoC, sends a request transaction to a slave, using an address to select the slave. The NoC decodes the address and transports the request from the master to the slave. The slave handles the transaction and sends a response transaction, which is transported back by the NoC to the master.

For a given set of performance requirements, such as connectivity and latency between source and destination, frequency of the various elements, maximum area available for the NoC logic, minimum throughput between sources and destinations, position on the floorplan of elements attached to the NoC, it is a complex task to create an optimal NoC that fulfills all the requirements with a minimum amount of logic and wires. This is typically the job of the chip architect or chip designer to create this optimal NoC, and this is a difficult and time-consuming task. In addition to this being a difficult task, the design of the NoC is revised every time one of the requirement changes, such as modifications of the chip floorplan or modification of the expected performance. As a result, this task needs to be redone frequently over the design time of the chip. This process is time consuming, which results in production delays. Therefore, what is needed is system and method to efficiently generate a NoC from a set of constraints, which are listed as requirements, and a set of inputs. The system needs to produce the NoC with all its elements placed on a floorplan of a chip.

A NoC is an example for designing scalable communication architecture for SoCs. It is more desirable to eliminate the conditions that result in a deadlock in a network when using NoCs in design applications. It is currently known to route messages through an array of data processing nodes to facilitate a plurality of paths directed to a destination without the occurrence of a message delayed by a routing deadlock. An important aspect when designing application-specific NoCs is a more desirable deadlock-free operation with the use of minimum power and area overhead. There are two main types of deadlocks that are known to occur in NoCs. The first type of deadlock is a routing dependent deadlock. The second type of deadlock is a message-dependent deadlock.

A current problem exists during NoC synthesis of new connections in an existing NoC, because it is challenging to reuse the existing topology and the production costs associated with the wiring are costly. Another problem that arises when performing an environmental NoC synthesis occurs after a change in the specification. For example, when new connections are added, a previous result is overwritten.

Thus, there is a need for a method for designing a NoC that avoids both routing dependent deadlocks and message-dependent deadlocks and are integrated with the topology synthesis phase of the NoC design flow. Considering the deadlock avoidance issue during topology synthesis, a more desirable NoC design may be achieved compared to traditional methods, where the deadlock avoidance issue is managed with separately. Further, there is a need for new connections to be added without overwriting a previous result.

SUMMARY

In accordance with various embodiments and aspects of the invention, systems and methods are disclosed that generate a network-on-chip (NoC) using a set of constraints and a set of step with inputs to produce or generate the NoC with all of its elements. The elements of the NoC are placed on a floorplan of a chip. An advantage of the invention is simplification of the design process and the work of the chip architect or designer. A NoC generation or synthesis method having an incremental design, whereby, the NoC is generated or synthesized one connection at a time. In particular, a set of nodes of a source-destination pair and each new connection is synthesized by taking the set of existing connections as an input. New components including, but not limited to, switches and/or links may be created when synthesizing a new connection to define a network route from a source to a destination. It is within the scope of this invention for a destination to include, but not be limited to, being a list of components to be traversed. Further, configuring the newly created components including, but not limited to a clock and/or data width is an important aspect when synthesizing a new connection.

In an embodiment, the set of existing connections may by empty. As a result, the NoC will be synthesized from the beginning of the process without an existing connection.

The order in which connections are implemented affects the quality of the topology. In an embodiment, the order may be determined based on a plurality of mathematical optimization techniques and/or heuristics. For example, the order may be determined by the area of the floorplan spanned by the connections. In another example, the order may be a latency based communication policy configured to measure delays in a packet's arrival at the destination and implements the more sensitive connections at a higher priority. It is within the scope of this invention for the synthesis order to be an input to the method for deterministic and incremental physically-aware NoC topology synthesis.

The system configured for automatically generating or synthesizing a deadlock-free NoC from a specification includes: a floorplan, being a physical layout of the chip; technological parameters including, but not limited to, wire delay and/or logic density; floorplan regions including, but not limited to, modules and/or clock limits; a clock domain crossing (CDC) being the traversal of a signal in a synchronous digital circuit from a first clock domain into a second clock domain; performance requirements; and a component having a configuration and location on the floorplan, connectivity requirements between a first component and a second component, and a communication policy between the first component and the second component.

A method of transforming an existing deadlock-free network-on-chip (NoC) configuration, the existing deadlock-free network-on-chip configuration including of a plurality of existing physical segments and a set of existing turns that are allowable between segments, the plurality of existing physical segments and the set of existing turns forming a plurality of existing routes. The method includes generating a new NoC configuration by generating and/or synthesizing at least a first new connection into the existing deadlock-free network-on-chip configuration, the first new connection having a source and a destination, the generating creating a first new deadlock free route from the source to the destination, whereby the new network-on-chip configuration is deadlock free, and wherein the generating a first new deadlock-free route from the source to the destination preserves existing routes.

The generating including: for each existing route, translating the route into segments and turns; identifying one or more new connections to be synthesized, each of the plurality of new connections having undefined routes, a source, and a destination associated therewith, the one or more new connections being identified together with a synthesis order; for each of the one or more new connections and in accordance with sorting, identifying a plurality of possible routes from the source to the destination for the new connection.

The possible route includes of one or more of: a new entry segment connecting the source to the existing deadlock-free NoC configuration; a new exit segment connecting the existing deadlock-free network-on-chip configuration to the destination; one or more new internal segments connecting existing segments of the existing deadlock-free network-on-chip configuration, whereby the one or more new internal segments connect the source to the destination, wherein a new internal segment is not considered if it would create a cyclic dependency among segments, thereby causing a deadlock; and existing segments only.

Filtering the plurality of possible routes based on one or more criteria, which includes: a communication policy criteria based on allowed latency of the route from the source to the destination of the new connection; any of a plurality of user-defined criteria; selecting one of the plurality of possible routes for synthesis; and/or synthesizing the selected possible route into the existing deadlock-free network-on-chip configuration.

In accordance with one or more embodiments of the invention, the first new deadlock free route includes at least one of an existing physical segment and a new physical segment.

In accordance with one or more embodiments of the invention, the generating a first new deadlock-free route from the source to the destination preserves all existing routes.

In accordance with one or more embodiments of the invention, incrementally repeating the generating of new deadlock free routes.

In accordance with one or more embodiments of the invention, identifying a synthesis order includes sorting the one or more new connections in accordance with a heuristic.

In accordance with one or more embodiments of the invention, at least a portion of the existing segment is physically immutable.

In accordance with one or more embodiments of the invention, an endpoint of at least a portion of an existing segment is a switch. The switch is physically immutable.

In accordance with one or more embodiments of the invention, any component is logically mutable causing at least one existing component being reconfigured in response to a new resulting topology.

In accordance with one or more embodiments of the invention, selecting one of the plurality of possible routes for synthesis includes selecting the possible route that maximizes use of the existing deadlock-free network-on-chip configuration, wherein existing segments are made physically immutable, with an exception of an entry and an exit segment, a switch is made physically immutable, and at least one network element is made logically immutable.

In accordance with one or more embodiments of the invention, selecting one of the plurality of possible routes for synthesis includes selecting the possible route that minimizes latency of the route.

In accordance with one or more embodiments of the invention, selecting one of the plurality of possible routes for synthesis includes selecting the possible route that maximizes use of the existing deadlock-free network-on-chip configuration, wherein existing segments are not made physically immutable, switches are allowed to have new connections, and existing network elements are made logically immutable, which includes keeping clock frequencies and other attributes unchanged.

In accordance with one or more embodiments of the invention, selecting one of the plurality of possible routes for synthesis includes selecting while existing segments are not made physically immutable, switches are allowed to have new connections, and existing network elements are reconfigurable.

A method for incremental synthesis and transformation of a deadlock-free network-on-chip topology includes receiving an input being a network topology. The network topology is translated into an existing segment; reusing the existing segment in a new route, the existing segment is formed by a path between a first node and a second node; splitting the existing segment recursively at any geographical point along the path between the first node and the second node to form a split segment; responsive to the splitting, synthesizing the new route by adding a new segment and a new turn to the split segment; and generating the deadlock-free network-on-chip topology by routing a packet from the turn of the existing segment to the new segment, thereby, avoiding a deadlock in the network.

In accordance with one or more embodiments of the invention, identifying a synthesis order including sorting the one or more new connections in accordance with a heuristic.

In accordance with one or more embodiments of the invention, at least a portion of the existing segment is physically immutable.

In accordance with one or more embodiments of the invention, an endpoint of the at least a portion of the existing segment is a switch. The switch is physically immutable.

In accordance with one or more embodiments of the invention, any component is logically mutable causing at least one existing component being reconfigured in response to a new resulting topology.

A non-transitory computer readable medium for storing code, which when executed by one or more processors, would cause the processor to: receiving an input topology of a network-on-chip (NoC) to determine a source-destination pair to be selected for synthesis and at least one existing connection; transcribing the source-destination pair into a pair of segments; transcribing the at least one existing connection into a pair of existing segments; determining if the NoC is deadlock-free; responsive to determining, if the NoC is the deadlock-free, extracting the pair of segments that do not have defined routes and sort them using a heuristic; inputting the pair of segments and the pair of existing segments into a configuration explorer, the configuration explorer determining a configuration for routing from a source to a destination of the source-destination pair, using a communication policy, the communication policy is configured to receive user defined parameters associated with the source-destination pair, the communication policy is in communication with a configuration filtering module, the configuration filtering module configured to output eligible configurations; selecting, using a configuration selection module, a final configuration to be implemented for connecting the source-destination pair; splitting the pair of existing segments that need to be connected to the pair of segments at a point dictated by the final configuration; creating a new segment dictated by the final configuration; activating corresponding turns connecting the pair of existing segments with the pair of segments; and computing the route from the source to the destination of the source-destination pair.

BRIEF DESCRIPTION OF THE DRAWINGS

FIG. 4 shows a connectivity table of a NoC in accordance with the various aspects and embodiments of the invention;

FIG. 5 shows a scenario table with throughput definitions for read and write transactions in accordance with the various aspects and embodiments of the invention;

DETAILED DESCRIPTION

Figure 1A:
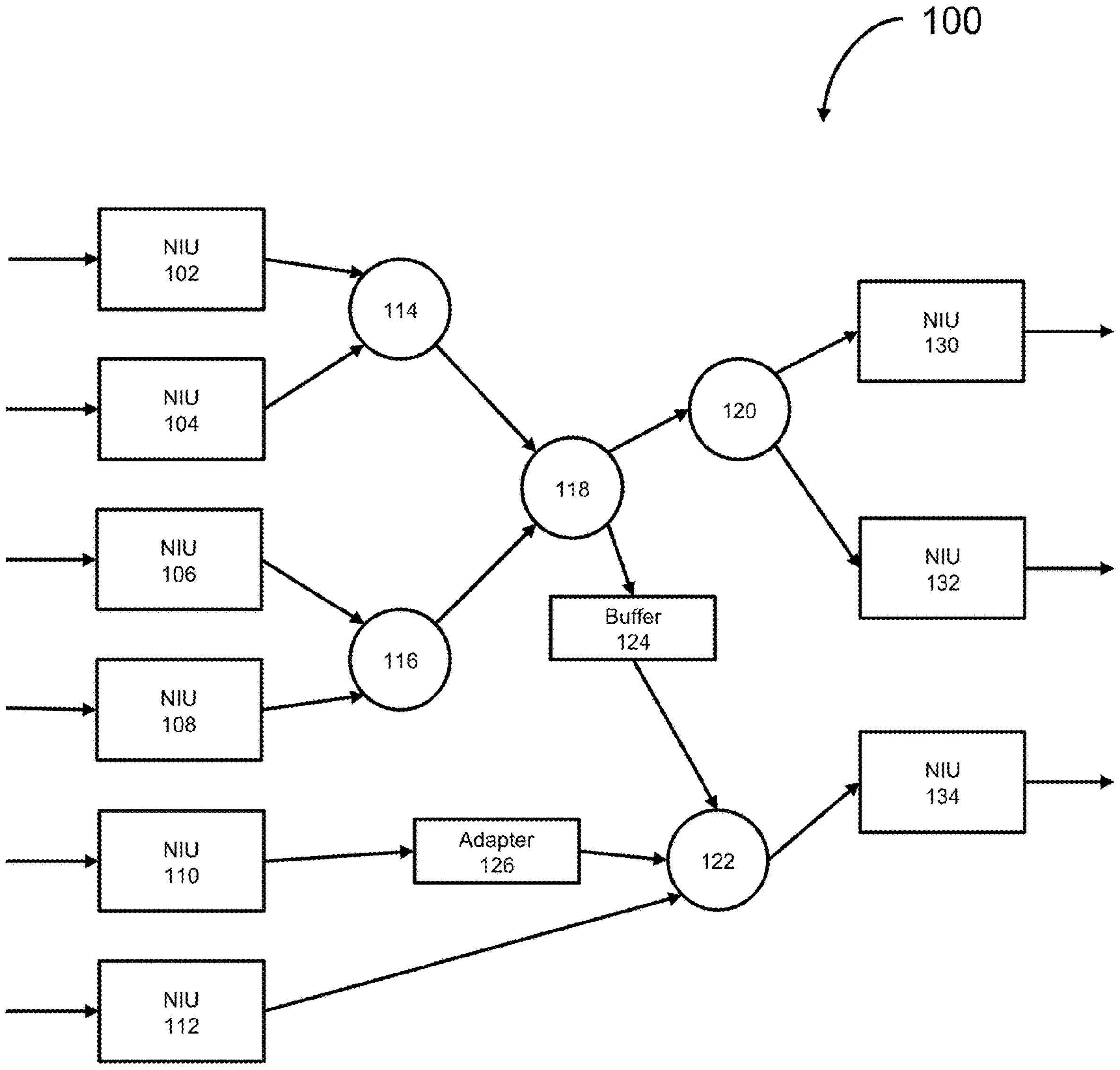
FIG. 1A shows a logic view of a network-on-chip (NoC) that includes various elements that create the NoC.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms “a,” “an” and “the” include plural referents unless the context clearly dictates otherwise. Reference throughout this specification to “one aspect,” “an aspect,” “certain aspects,” “various aspects,” or similar language means that a particular aspect, feature, structure, or characteristic described in connection with any embodiment is included in at least one embodiment of the invention.

Appearances of the phrases “in accordance with one or more embodiments,” “in one embodiment,” “in at least one embodiment,” “in an embodiment,” “in certain embodiments,” and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future.

As used herein, a “master” and a “initiator” refer to similar intellectual property (IP) modules or units and the terms are used interchangeably within the scope and embodiments of the invention. As used herein, a “slave” and a “target” refer to similar IP modules or units and the terms are used interchangeably within the scope and embodiments of the invention. As used herein, a transaction may be a request transaction or a response transaction. Examples of request transactions include write request and read request.

As used herein, a node is defined as a distribution point and/or a communication endpoint that is capable of creating, receiving, and/or transmitting information over a communication path or channel. A node may refer to any one of the following: switches, splitters, mergers, buffers, and adapters. As used herein, splitters and mergers are switches; not all switches are splitters or mergers. As used herein and in accordance with the various aspects and embodiments of the invention, the term “splitter” describes a switch that has a single ingress port and multiple egress ports. As used herein and in accordance with the various aspects and embodiments of the invention, the term “merger” describes a switch that has a single egress port and multiple ingress ports.

Referring now to FIG. 1A, a network-on-chip (NoC) 100 is shown in accordance with various aspects and embodiments of the invention. The NoC 100 is one example of a network. In accordance with various aspects and embodiments of the invention, a network includes a set of nodes and set of edges, each of these has a model and can be used at the heart of the synthesis to perform and implement transformation over the network and converge to the best solution fitting the specified requirements. The NoC 100 includes nodes and endpoints and uses elementary network functions that are assembled, such as: network interface units (NIUs) 102, 104, 106, 108, 110, 112, 130, 132, and 134, nodes/switches 114, 116, 118, 120, and 122; adapters, such as adapter 126; and buffers, such as buffer 124. The NoC elementary network functions use an internal transport protocol, which is specific to the NoC 100, to communicate with each other, typically based on the transmission of packets. The NIUs convert the protocol used by the attached system-on-chip (SoC) unit (not shown), into the transport protocol used inside the NoC 100. The switches route flows of traffic between source and destinations. The buffer 124 is used to insert pipelining elements to span long distances, or to store packets to deal with rate adaptation between fast senders and slow receivers or vice-versa. The adapter 126 handles various conversions between data width, clock and power domains.

Figure 1B:
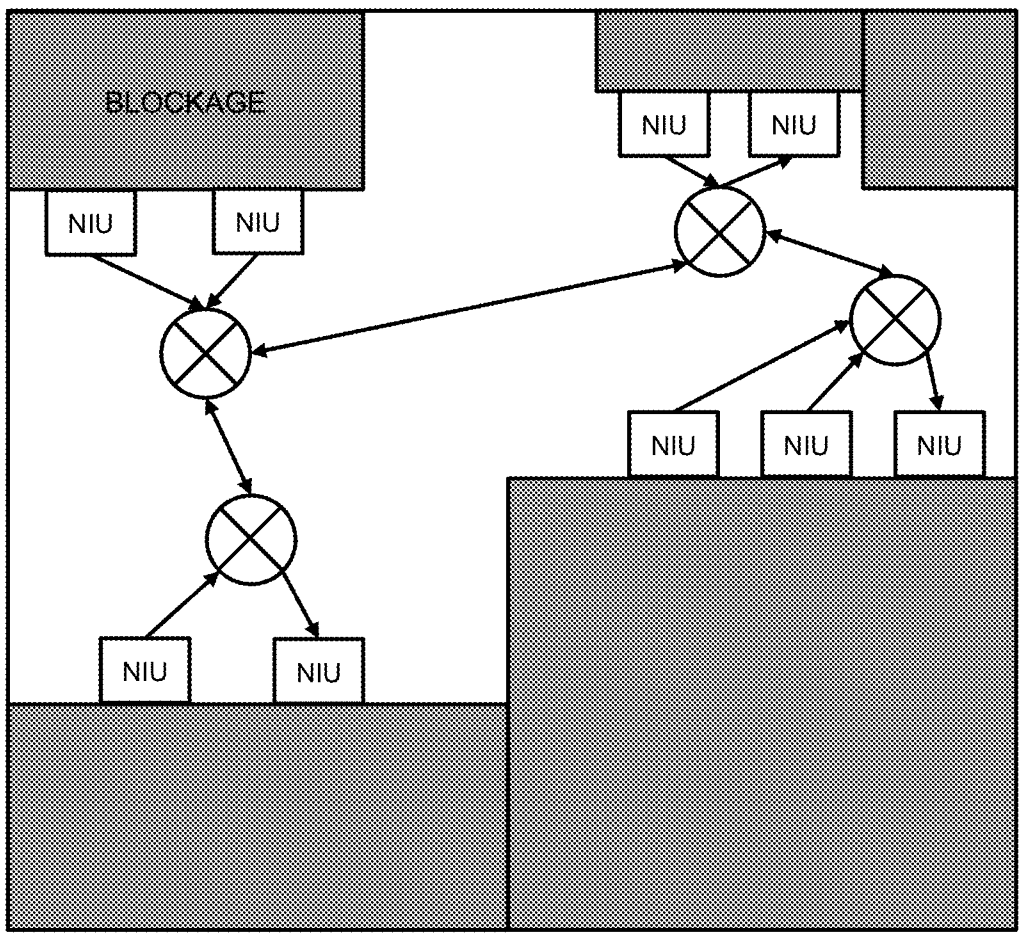
FIG. 1B shows a NoC with elements placed on a floorplan of a network.

Referring now to FIG. 1B, a NoC 150 is shown with various elements, such as NIUs, switches, and blockage areas in the floorplan. The NoC 150 includes various connectivity elements through various switches. In accordance with one aspect of the invention, a set of constraints are used as input to the tool, which is discussed in greater detail below. In accordance with some aspects of the invention, the tool executes a set of sub-steps and produces the description (synthesis) of a resulting NoC, such as the NoC 150, with its configured elements and the position of each element on the floorplan. The generated description is used to actually implement the NoC hardware, using the physical information produced to provide guidance to the back-end implementation flow.

Figure 2A:
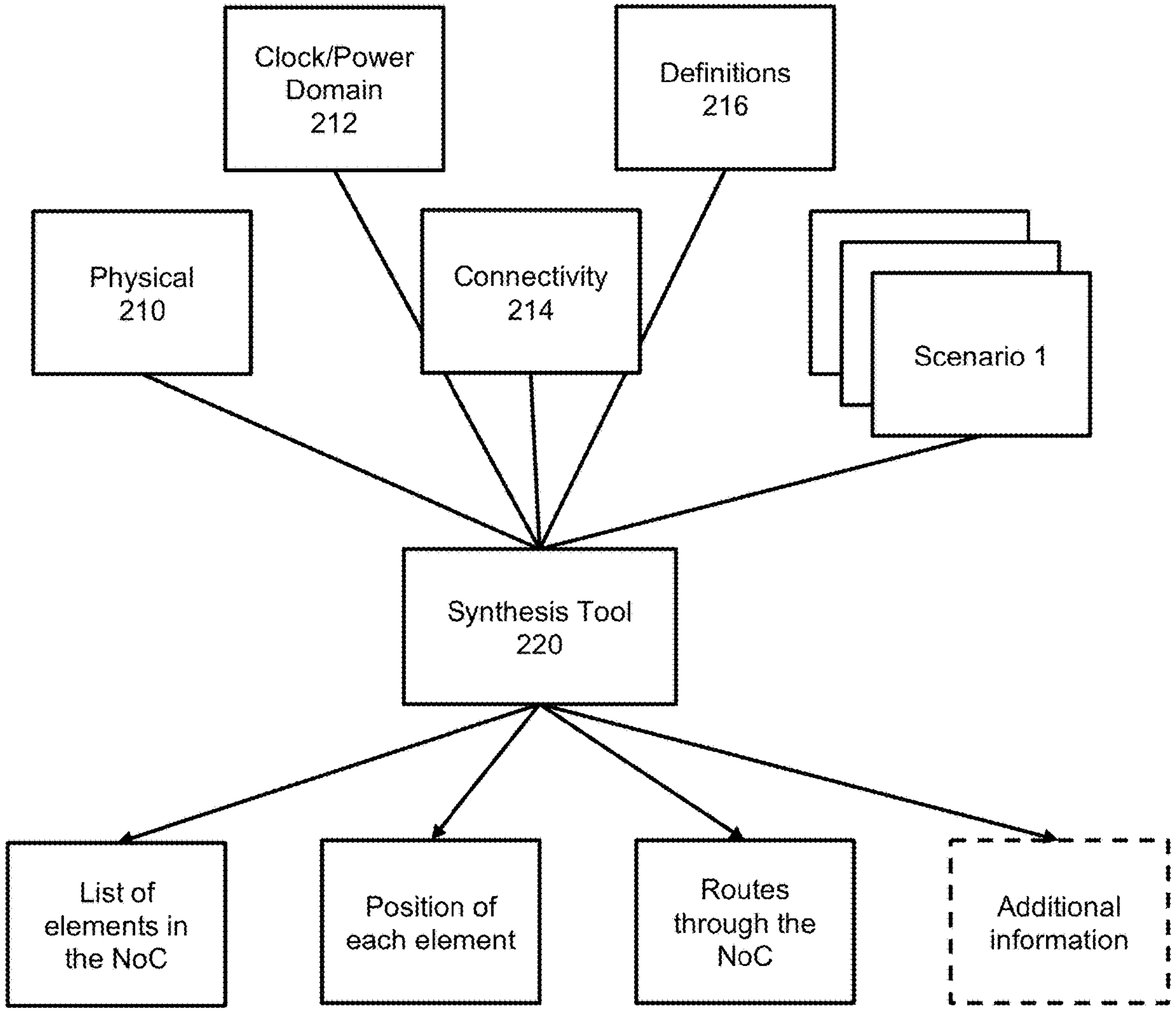
FIG. 2A shows a method for generating a NoC description based on a set of constraints in accordance with various aspects and embodiments of the invention.

Referring now to FIG. 2A, in accordance with some aspects of the invention, a set of constraints (210, 212, 214, 216, and Scenarios) are provided to a synthesis tool 220. In accordance with some embodiments and aspects of the invention, the performance and function of the tool 220 may include third-party ASIC implementation tools such as logic synthesis, place and route back end tools, and so on. A designer or user builds the set of constraints that are provide to the tool 220. The constraints are captured in machine-readable form, such as computer files using a defined format to capture information, that is understood and processed by the tool. In accordance with one aspect of the invention the format is XML. In accordance with another aspect of the invention the format is JSON. The scope of the invention is not limited by the specific format used.

Figure 2B:
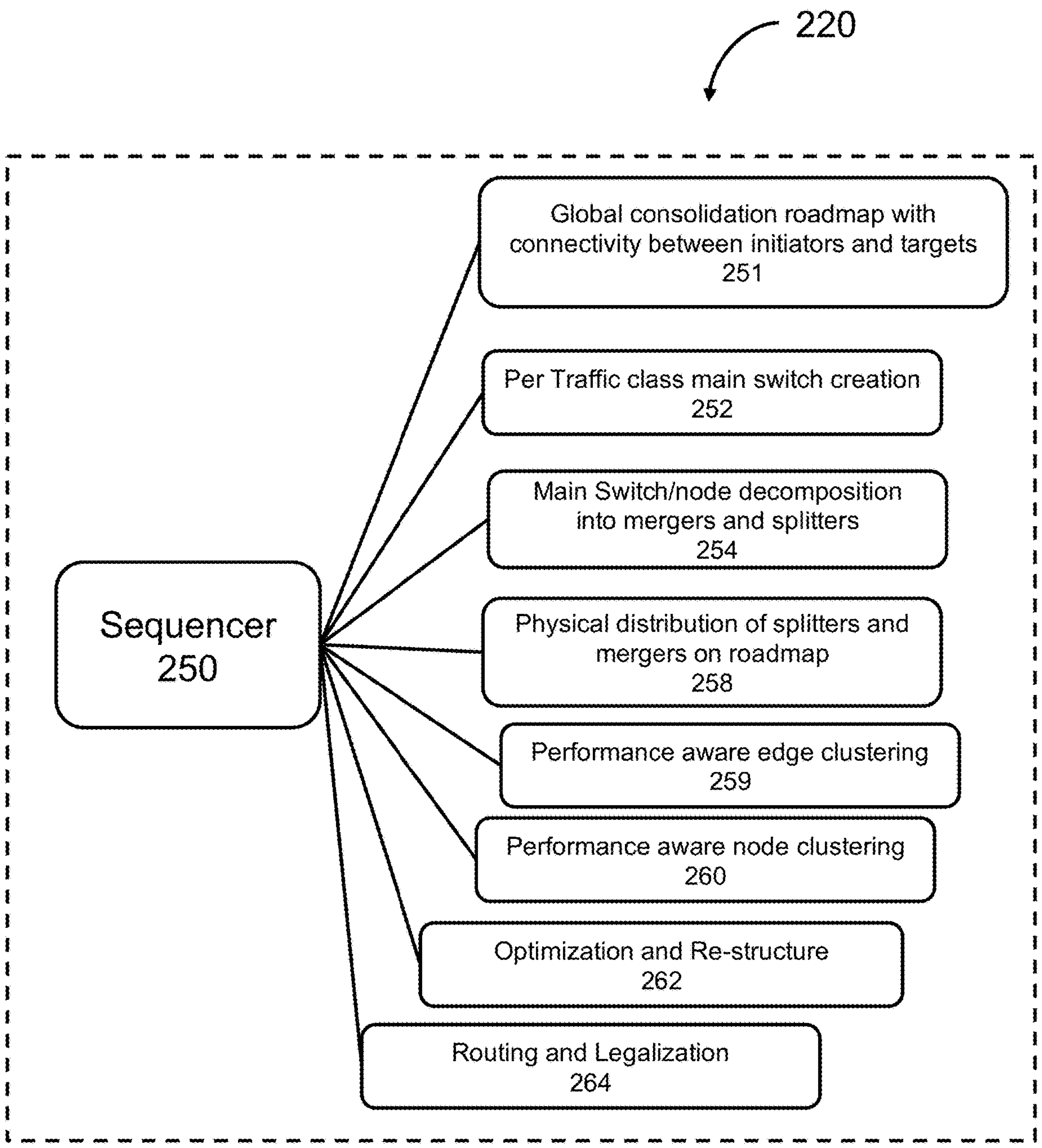
FIG. 2B shows a block diagram of a NoC synthesis tool in accordance with various aspects and embodiments of the invention.

Referring now to FIG. 2B, the tool reads the files containing the description of the constraints and executes the synthesis process. In accordance with some aspects of the invention, the synthesis process is broken down into multiple steps. A sequencer 250 is responsible for executing each step of the process. In accordance with some aspects of the invention, a set of steps are executed by the sequencer 250 of the tool 220 in light of the constraints set forth by the user/designer. The scope of the invention is not limited by the number and kind of steps the sequencer 250 may call and execute.

Referring again to FIG. 2A along with FIG. 2B, in accordance with the various aspects of the invention, the designer of the network provided and defines a set of constraints, such as constraints 210, 212, 214, and 216. A sequencer 250 receives various inputs, including: input 251 that includes global consolidation roadmaps with connectivity between initiators and targets including roadmap creation and information between each master and slave; input 252 that includes traffic classification and main switch creation; input 254 that includes main switch decomposition into mergers and splitters; input 258 that includes information about physical distribution of splitters and mergers in the roadmap; input 259 that includes information about edge clustering; and input 260 that includes information about performance aware node clustering. In accordance with one aspect of the invention, the sequencer 250 also receives input 262 that includes information about optimization and network restructuring. In accordance with one aspect of the invention, the sequencer 250 receives 264 that includes information about routing and legalization. In accordance with various aspects and embodiments of the invention, the sequencer 250 uses all the inputs 251-264 to generate the network. In accordance with various aspects and embodiments of the invention, the sequencer 250 uses a combination of the inputs 251-264 to generate the network.

In accordance with the various aspects of the invention, input 251 includes input about the global consolidation roadmap. The global consolidation roadmap includes a consolidation model that captures the global physical view of the connectivity of the floorplan's free space, as well as the connectivity across/between the initiators and targets. The global consolidation roadmap is modeled by a graph of physical nodes and canonical segments that are used to position the nodes. (splitters, mergers, switches, adapters) of the network under construction. The global consolidation roadmap is used to fasten computation. In accordance with various aspects of the invention, the global consolidation roadmap is persistent, which means that it is data the system exports and re-consumes in incremental synthesis and subsequent runs.

In accordance some aspects of the invention, input 259 incudes information about edge clustering. Edge clustering aims to minimize resources and enhancing performance goals through proper algorithms and techniques. In accordance with some aspects of the invention, edge clustering is applied in conjunction and in cooperation with input 260, node clustering. Edge clustering and node clustering can be used in combination by mixing, by being applied concurrently, or by being applied in sequence. The advantage and goal is to expand the spectrum of synthesis and span a larger solution space for the network.

In accordance with various aspects of the invention, input 262 includes information about re-structuring. Re-structuring includes a variety of transformations and capabilities. In accordance with some aspects of the invention, the transformations are logical in that there is a change in structure of the network. In accordance with some aspects of the invention, the transformation are physical because there is a physical change in the network, such as moving a node to a new location. Other examples of re-structuring include: breaking a node into smaller nodes; reparenting between nodes; network sub-part duplication to avoid deadlocks and to deal with congestion; and physically re-routing links to avoid congestion areas or to meet timing constraints.

Figure 3:
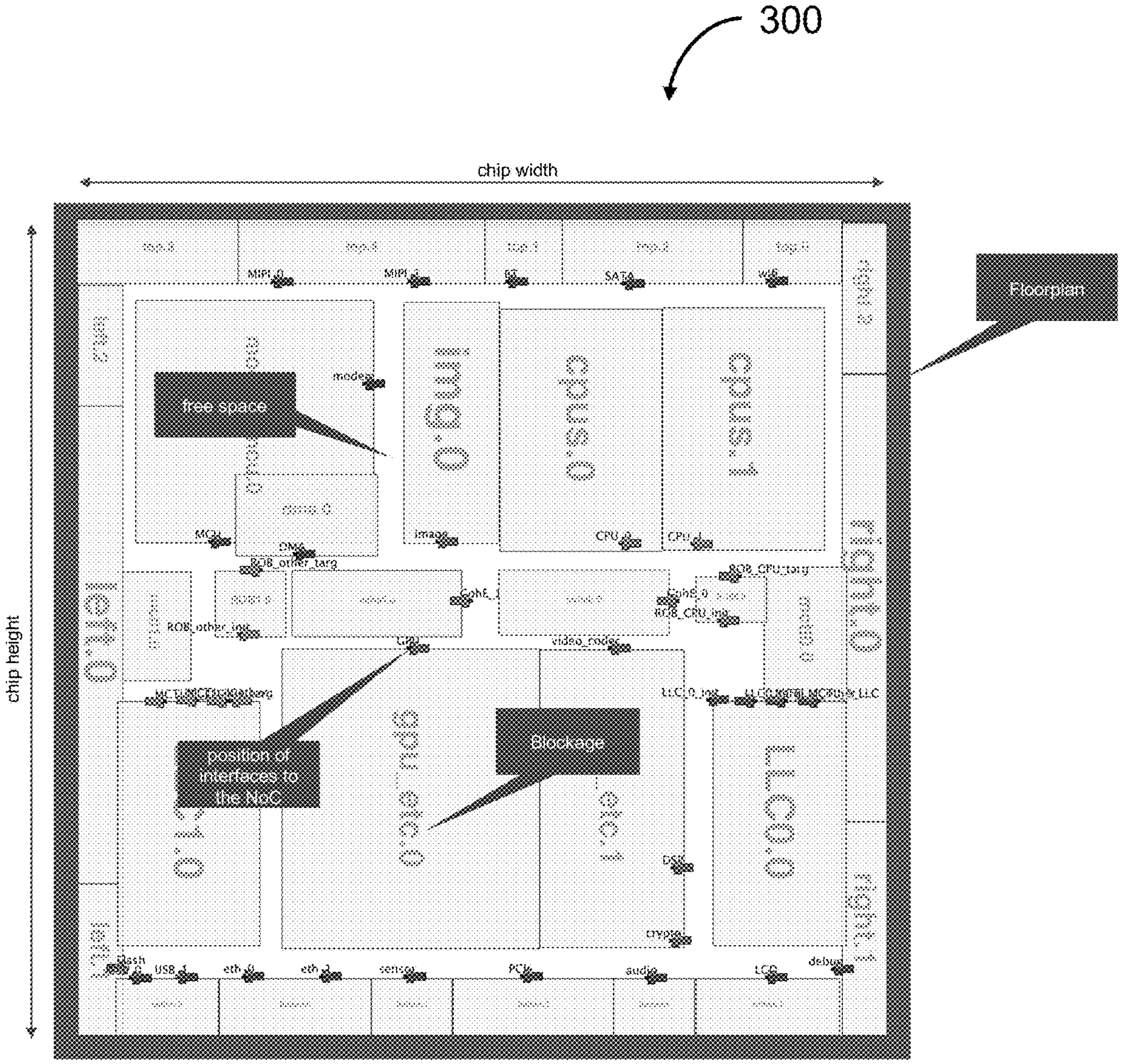
FIG. 3 shows a graphical view of the floorplan of a chip with blockage areas and positions of interface to the NoC in accordance with various aspects and embodiments of the invention.

Referring now to FIG. 3, in accordance with the various aspects of the invention, a floorplan 300 of the chip onto which the NoC is implemented is shown, with positions for various initiator interfaces and target interfaces. The physical constraint 210 provides physical information about the design that includes: the size of the chip onto which the NoC will be implemented; the various blockages areas on the floorplan, which are rectangles representing area of the chip onto which the NoC logic cannot exist or be placed; the free space, which is area of the chip where the NoC logic can exist and is defined by area not covered by a blockage; and the position of the interfaces between the SoC units and the NoC, which is the position of the initiator interfaces and the targets interfaces, such as NIUs.

In accordance with the various aspects of the invention, another constraint includes extension of the clock domain and power domain 212 can also be provided. The domain 212 includes areas of the chip where logic belonging to a particular domain is allowed to be placed.

In accordance with the various aspects of the invention, capabilities of the logic library, which will be used to implement the NoC, are provided. The information includes the size of a reference logic gate, and the time it takes for a signal to cover a 1 mm distance.

Referring again to FIG. 2A, in accordance with the various aspects of the invention, a SoC includes multiple clocks domains and multiple power domains. A clock domain is defined by all the logic fed by a given clock input. The clock input is characterized by the frequency of the clock, which is its most important parameters. A power domain is defined by all the logic getting power supply from the same power source. In accordance with the various aspects of the invention, the power source is gated, thus, the power domain can be on or off or isolated from other power domains. As such, the designer provides the set of clock domain and power domain constraints 212 as part of the initial design.

In accordance with the various aspects of the invention, initiators and targets are communicatively connected to the NoC. An initiator is a unit that send requests, typically read and write commands. A target is a unit that serves or responds to requests, typically read and writes commands. Each initiator is attached to or connected to the NoC through a NIU. The NIU that is attached to an initiator is called an Initiator Network Interface Unit (INIU). Further, each target is attached to the NoC through an NIU. The NIU that is attached to a target is called a Target Network Interface Unit (TNIU). The primary functionality of the NoC is to carry each request from an initiator to the desired destination target, and if the request demands or needs a response, then the NoC carries each target's response to the corresponding requesting initiator. Initiators and targets have many different parameters that characterize them. In accordance with the various aspects of the invention, for each initiator and target, the clock domain and power domain they belong to are defined. The width of the data bus they use to send write and receive reads payloads is a number of bits. In accordance with the various aspects of the invention, the width of the data bus for the connection (the communication path to/from a target) used to send write requests and receive write responses are also defined. Furthermore, the clock and power domain definition are a reference to the previously described clock and power domains existing in the SoC, as described herein.

Continuing with FIG. 2A and FIG. 2B and referring also to FIG. 4, a connectivity table 400 is shown. In accordance with the various aspects of the invention, the table 400 allows for traffic to be defined by classification. The tool permits using a traffic class label for each connection between an initiator and a target. As shown in table 400, there are three traffic classes: L1, L2, and L3. A traffic class label is an arbitrary label, chosen by the user or designer. Any number of labels can be defined and the scope of the invention is not limited by the number of labels. Each label represents the need for independent network resources. Each label will be given a distinct sub-network by the invention, which can be physically different, or use virtual networks, if supported by the underlying NoC technology.

In accordance with the various aspects of the invention, initiators are not required to be able to send requests to all targets or slaves that are connected to the NoC. The precise definition of the target that can receive requests from an initiator is outline or set forth in the connectivity table, such as table 400. The connectivity and traffic class labelling information can be represented as a matrix. Each master has a row and each slave has a column. If a master must be able to send traffic to a slave, a traffic class label must be present at the intersection between the master row and the slave column. If no label is present at an intersection, then the tool does not need connectivity between that master and that slave. For example, master 1 (M1) is connectively communicating with slave 1 (S1) using a defined label 1 (L1) while M1 does not communicate with S2 and hence there is no label in the intersection of M1 and S2. In accordance with the various aspects of the invention, the actual format used to represent connectivity can be different, as long as each pair of master-slave combination has a precise definition of its traffic class, or no classification label if there is no connection.

Referring now to FIG. FIG. 5, a table 500 is shown in accordance with the various aspects of the invention, that includes various scenarios (shown in FIG. FIG. 2A) for read (RD) and write (WR) transaction. The table 500 includes information that define the various throughput rates provided to the tool. A scenario defines the expected performance in term of throughput of data between a master and a slave. Each scenario describes the expected required read bandwidth and the expected required write bandwidth between each initiator and each target. Throughput is defined in bytes-per-second (B/s). A typical SoC will have multiple mode of operations. As an example, a SoC for a smartphone might have a gaming mode of operation, an audio call mode of operation, an idle mode of operation and so on. These define scenarios that depend on different throughput rates. Thus, a set of scenarios represents the different mode of operation the SoC supports and, correspondingly, the expected NoC minimum performance in terms of throughput between masters and slaves.

A scenario can be represented as 2 matrices, one defining read throughputs and one defining write throughputs. In accordance with the various aspects of the invention, read throughput requirements will be used to size the response network, which handles data returning from slaves back to master. Write throughput requirements will be used to size the request network, which is data going from master to slave, in accordance with the various aspects of the invention. An example, in accordance with the various aspects of the invention, of the throughput requirements for the various scenarios is shown in table 500. The actual format used to represent a scenario can be different, as long as each pair of (master, slave) has a precise definition of its minimum required throughput for read and for write. In table 500, read transaction from M1 to S1 has a minimum performance throughput of 100 MB/s. In table 500, a write transaction from M1 to S1 has a minimum throughput of 50 MB/s.

In accordance with some aspects of the invention, scenarios are not defined for the tool, in which case the tool optimizes the NoC synthesis process for physical cost, such as lowest gate cost and/or lowest wire cost.

Figure 6:
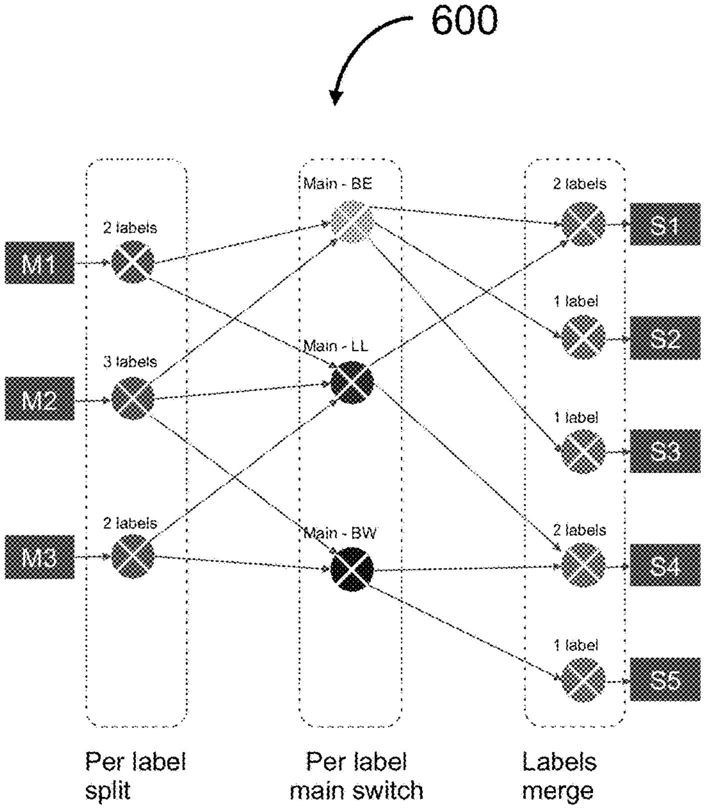
FIG. 6 shows creation of a network with 3 traffic classes in accordance with the various aspects and embodiments of the invention.

Referring now to FIG. FIG. 6 along with FIG. FIG. 2B, an initial network 600 is created in accordance with the various aspects of the invention. The network 600 implements the connectivity matrix with the following defined parameter or components:

- one network interface unit per master,
- one network interface unit per slave,
- one switch is created per defined traffic class, called the main switch of the class,
- one switch after each initiator/master NIU that split traffic to the different main switches that this master needs to reach,
- one switch before each target/slave NIU that merges traffic from the different main switches that are sending traffic to that target The data width of each switch, and the clock domain it belongs to, is computed using the data width of each attached interface, and their clock domain, as inputs to the tool. In accordance with the various aspects of the invention, each step that transforms the network, which is part of the NoC, also perform the computation of the data width and the clock domain of the newly created network elements.

Figure 7:
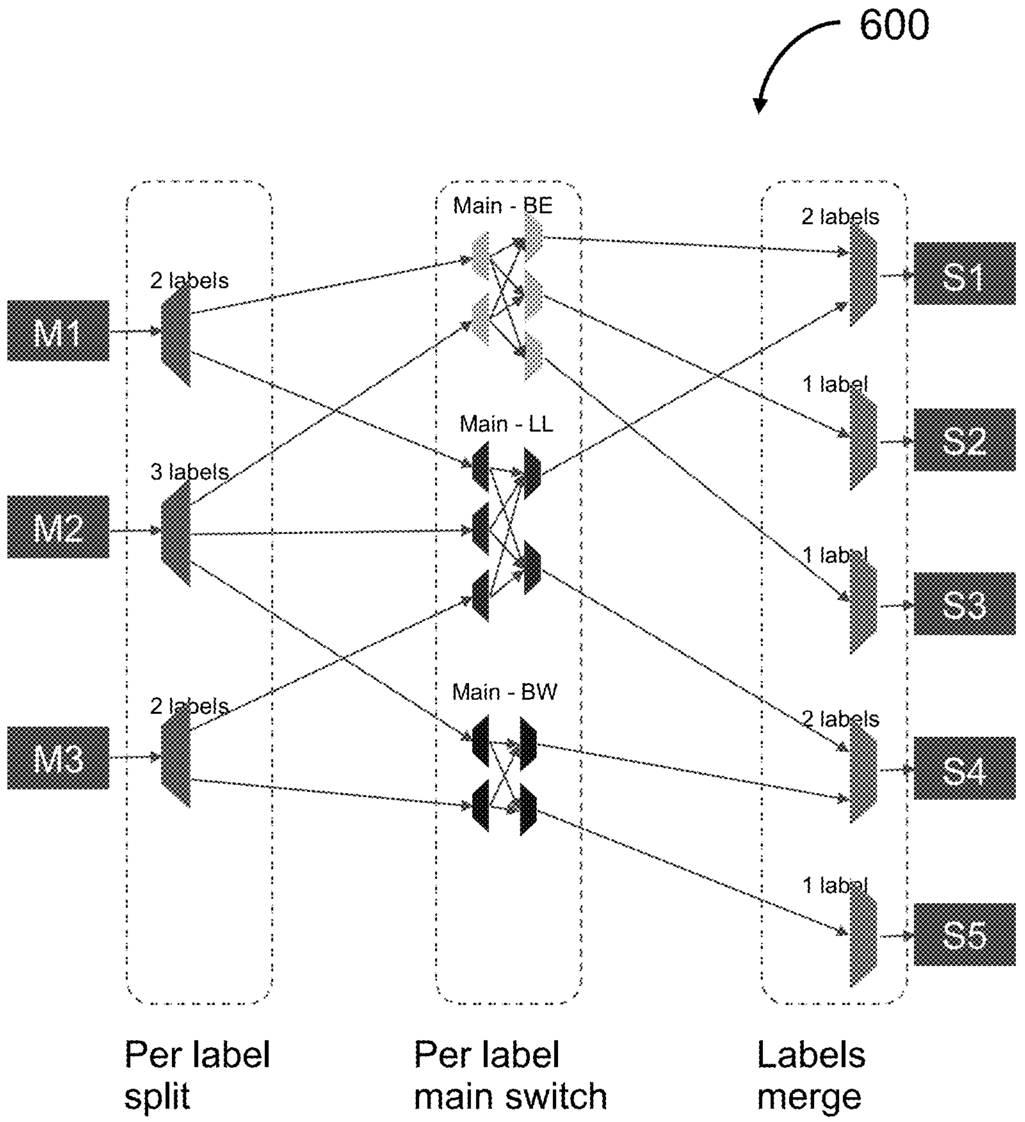
FIG. 7 shows decomposition of the network of FIG. 6 with mergers and splitters in accordance with the various aspects and embodiments of the invention.

Referring now to FIG. FIG. 7 and FIG. FIG. 2B, the network 600 of FIG. FIG. 6 is shown wherein the tool's process transforms of the network 600 in accordance with the various aspects of the invention. The sequencer 250 has an input 254 representing the main switch decomposition into mergers and splitters. The tool decomposes each main switch of the network 600 into its equivalent implementation with splitters and mergers. In accordance with the various aspects of the invention, some switches have a single ingress port and multiple egress ports. In accordance with the various aspects of the invention, some switches that have multiple ingress ports and a single egress port. Each main switch ingress port is connected to a splitter, each main switch egress ports is connected to a merger. For a main switch, splitters and mergers are connected together according to the connectivity table.

Figure 8:
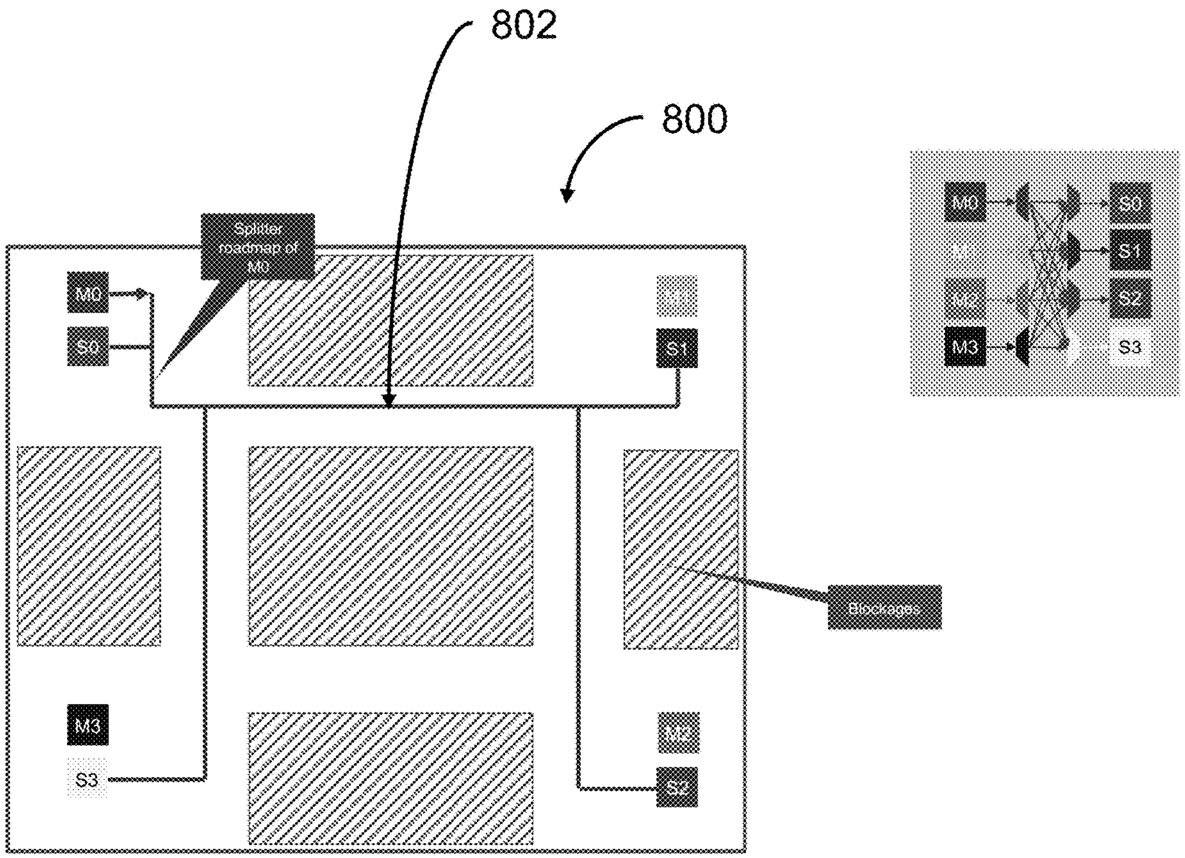
FIG. 8 shows a roadmap in a floorplan for one master of the network of FIG. 6 in accordance with the various aspects and embodiments of the invention.

Referring now to FIG. 8, a floorplan 800 is shown in accordance with the various aspects of the invention. The sequencer 250 has an input 256 representing a roadmap creation between each master and slave. The floorplan 800 includes a physical path 802 that is computed between a master interface (M0) on the floorplan, and each of its connected slaves, such as slave S0, slave S1, slave S2, and slave S3. The path 802 is called the splitter roadmap of the master M0; while not shown, every master will have a splitter roadmap. The tool uses any algorithm suitable to finding a path between a source point and multiple destination points, including algorithms that minimizes the length of the paths.

Figure 9:
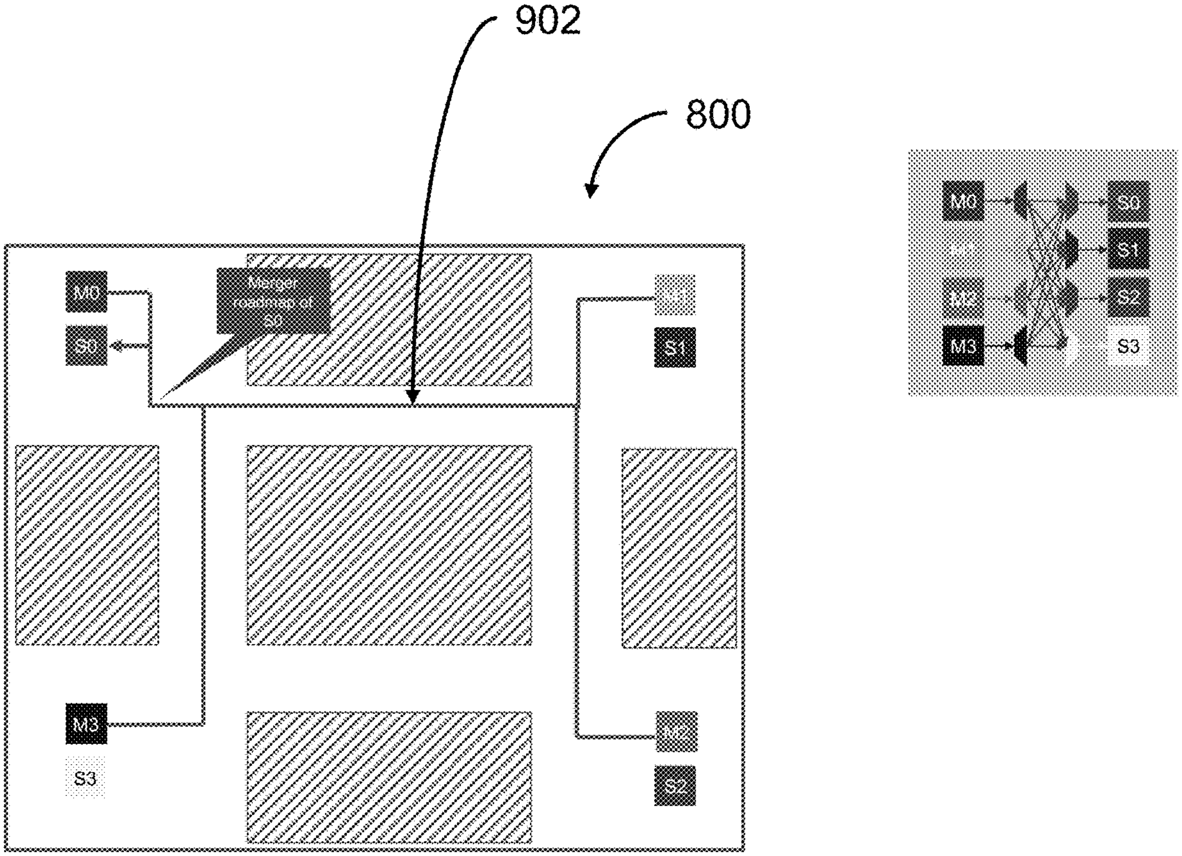
FIG. 9 shows a roadmap in a floorplan for one slave of the network of FIG. 6 in accordance with the various aspects and embodiments of the invention.

Referring now to FIG. 9, the floorplan 800 with a computed a physical path 902 between a slave interface for the slave S0 on the floorplan and each of its connected masters. The path 902 is a merger roadmap of the slave S0. As will be apparent, every slave will have a merger roadmap. The tool uses any algorithm suitable to finding a path between multiple sources point and a destination point can be used, including algorithms that minimizes the length of the paths. In accordance with the various aspects of the invention, the tool transforms the network in a way that maintains its functionality and adds location information to the network elements.

Figure 10:
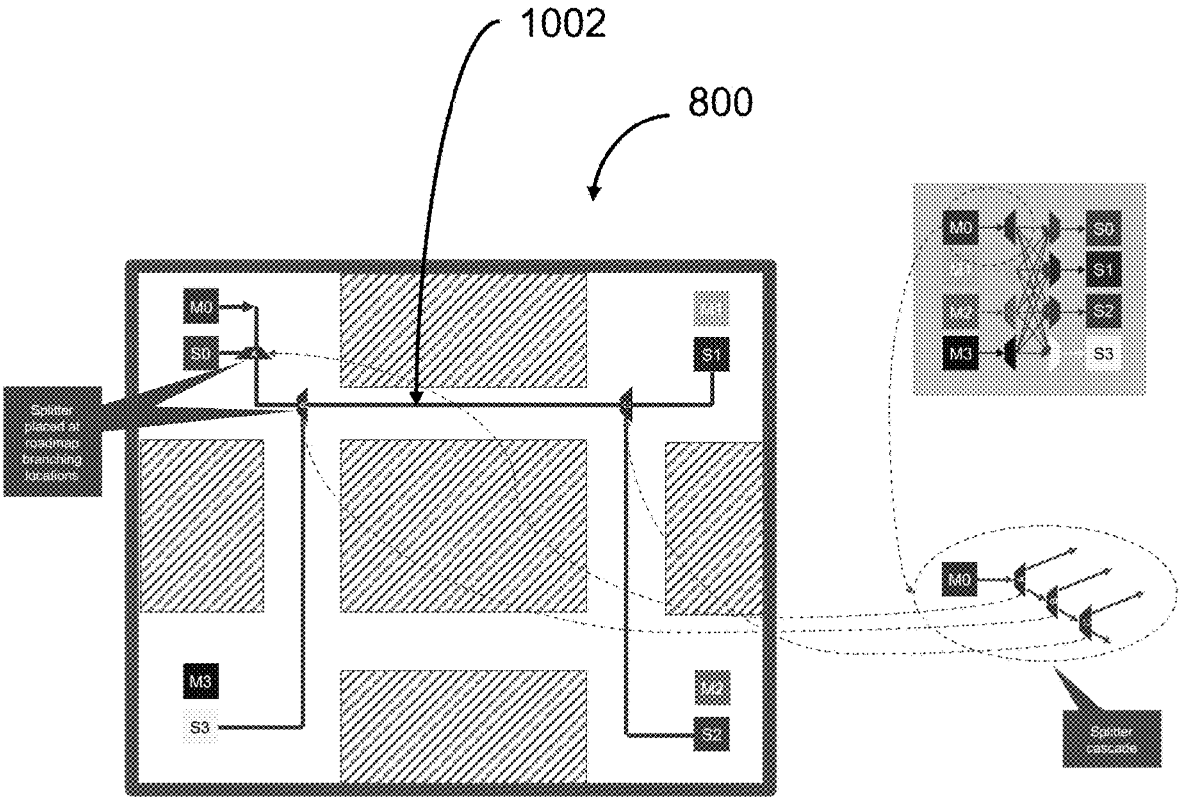
FIG. 10 shows decomposition of a main node splitter into a cascade of splitters distributed physically along the roadmap of FIG. 8 in accordance with the various aspects and embodiments of the invention.

Referring now to FIG. 10, the floorplan 800 is shown with a path 1002 in accordance with the various aspects of the invention. The sequencer 250 has an input 258 the provides physical distribution of splitters and mergers on the roadmap. Using the tool, each switch is decomposed into mergers and splitters. Using the tool, each splitter in the main switch is decomposed further into a cascade of splitters and each splitter of the cascade being placed on a branching point of the splitter roadmap of the attached master. The branching point of the roadmap is defined by the fact that the path is being split into two or more branches.

Figure 11:
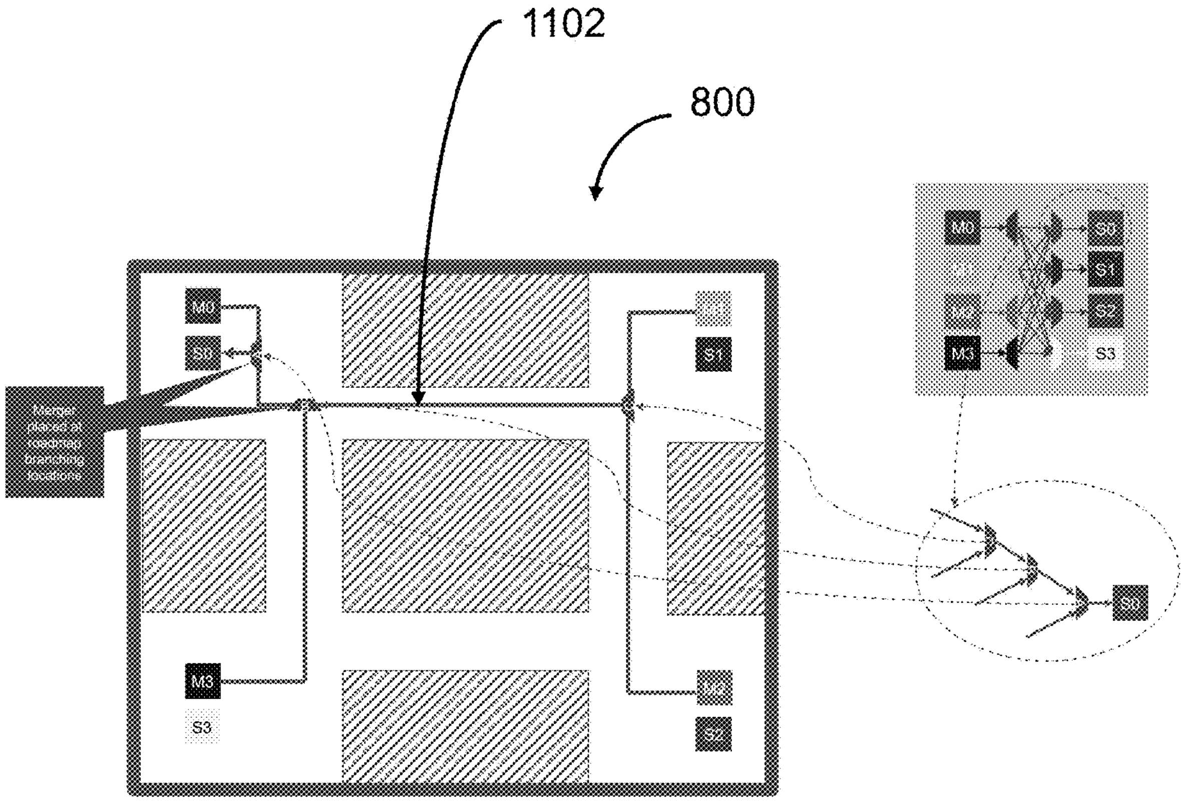
FIG. 11 shows decomposition of a main node merger into a cascade of mergers distributed physically along the roadmap of FIG. 9 in accordance with the various aspects and embodiments of the invention.

Referring now to FIG. 11, the floorplan 800 is shown with a path 1102 in accordance with the various aspects of the invention. Using the tool, each switch for each of the mergers in the main switch, the merger is decomposed further into a cascade of mergers, each merger of the cascade being placed on a branching point of the merger roadmap of the attached slave. The branching point of the roadmap is defined by the fact that the path is being split into two or more branches. The process of decomposing a splitter in a cascade of splitters preserves the original splitter functionality, as the number of inputs to the cascade is still one, and the number of outputs of the cascade is identical to the number of outputs of the original splitter. The process of decomposing a merger in a cascade of mergers preserves the original merger functionality, as the number of outputs of the cascade is still one, and the number of inputs to the cascade is identical to the number of inputs to the original merger. In accordance with the various aspects of the invention, the effect of the process is to obtain a set of elementary switches, which are represented by the mergers and the splitters, that are physically placed close to where the actual connections between switches need to be.

In accordance with the various aspects of the invention, the tool transforms the network in order to reduce the number of wires used between switches achievable, while keeping the performances as defined in the scenarios, which are a set of required minimum throughput between master and slave. In accordance with the various aspects of the invention switches are clustered for performance aware switching, mergers and splitters that have been distributed on the roadmaps are treated like ordinary switches.

In accordance with an aspect of the invention, the tool uses a process that is iterative and will merge switches under the condition that performances are still met, until no further switch merge can occur. The tool uses a process that is described as follows:

1) while no more switch fusion is possible, do the following:
   a) Select a candidate switch for fusion with one of its neighbors. The selection process ensures all switches in the network are eventually candidates.
   b) When a candidate is selected, search for a neighbor to fusion with. The neighboring criteria is based on evaluation of a cost function. The cost function shall return a switch that is "best suited" to fusion with the candidate. The definition of "best suited" is implementation dependent, but the cost functions shall be such that the potential fusion of the two switches maximizes the gain in term of at least one metric including: wire length; logic area; power; and performances, etc.
   c) Test if, in case the fusion happens, that the performance scenarios will still all meet the minimum throughput requirements. If not, then these two switches cannot be merged. The process executed by the tool searches for another neighbor until either no more neighbors can be found, in which case all switches are left intact, or one neighbor is found that can be merged with the candidate without violating the minimum throughput requirements of all scenarios, in which case the network is modified by merging the candidate switch with the neighbor.

In accordance with various aspects of the invention, it is possible for the process to ensure the switches do not grow above a certain size (maximum number of ingress ports, maximum number of egress ports). If a combined switch is above the set threshold, then the merge is prevented.

Figure 12:
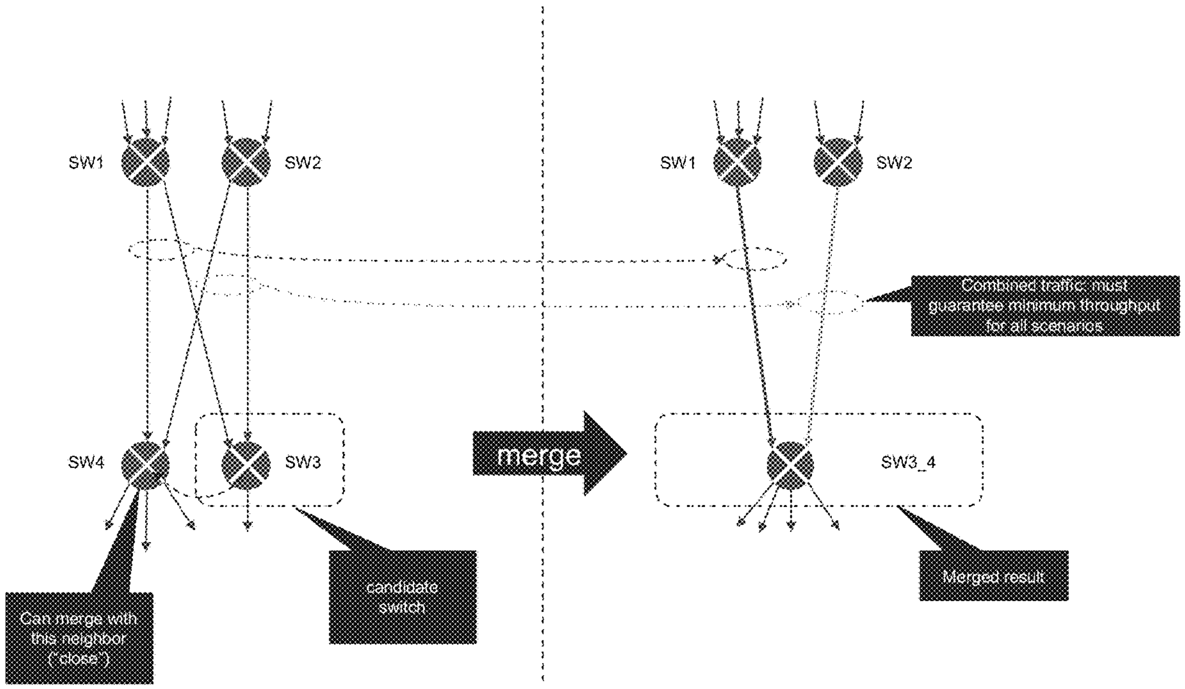
FIG. 12 shows an example of two nodes that are close and merged in accordance with the various aspects and embodiments of the invention.

Referring now the FIG. 12, candidate switch SW3 is shown next to switch SW4 for the merger, in accordance with the various aspects of the invention. The sequencer 250 has an input 260 that provides performance aware switching clustering. The tool executes a process for merging two switches. When the switches are merged, the wires that were going from different switches, are simplified into one wire from each connected switch to the combined switch. In accordance with the various aspects of the invention, switches SW3 and SW4 are merged. The connections between SW1 and SW4 and SW3, are combined and replaced by a single connection between SW1 and SW3_4. Thus, long connections between distant switches are removed and reduced to a minimum, while connections between close switches are removed and done inside the switch themselves.

Referring again to FIG. 2B, an input 262 to the sequencer 250 includes various optimizations can be performed to further reduce the number of wires used by the network, the area of the network elements, and the power consumed by network elements. Examples of such optimization include: detection of links that can be removed because they are not used, or their traffic can be re-routed; reducing the width of a link if the link is wider than required by the scenarios; and performing wire length optimization through finding an optimal placement of all the switch elements that minimizes the total wire length of the network, wherein the total wire length of the network is the sum of the distance spanned by each connection between network elements times the width of that connection.

Continuing with FIG. 2B, an input 264 to the sequencer 250 includes producing a legal NoC by modifying the location of the network elements so that the network elements fit in the allocated free space and do not overlap, and they exist in the corresponding clock and power domain limits. In accordance with various aspects of the invention, the area occupied on the die by each network element is computed using the information provided regarding the capabilities of the technology, such as the area of a reference logic gate. Then each element is tested for correctness of its placement (enough free space exists for the element, no other element overlaps). If the test fails, the element is moved until a suitable location is found where the test passes.

Formalism

Figure 13:
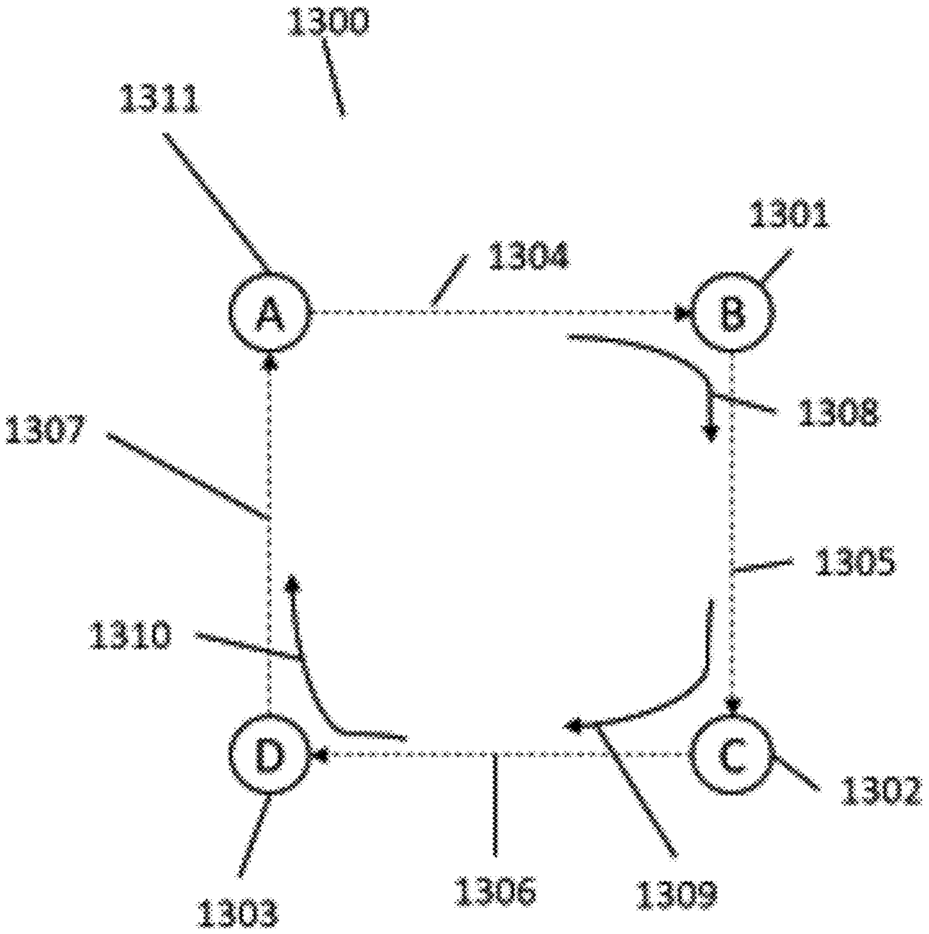
FIG. 13 illustrates a NoC topology over a floorplan having a deadlock-free network of segments and turns in accordance with the various aspects and embodiments of the invention.

Referring now to FIG. 13, floorplan 1300 illustrates a deadlock-free NoC that may be expressed in terms of a plurality of segments and turns. A segment represents a directed channel between two components, for example, "A" 1311 and "B" 1301, "B" 1301 and "C" 1302, "C" 1302 and "D" 1303, and/or "D" 1303 and "A" 1311. First segment 1304 holds a physical path in the floorplan between "A" 1311 and "B" 1301, second segment 1305 holds a physical path in the floorplan between "B" 1301 and "C" 1302, third segment 1306 holds a physical path in the floorplan between "C" 1302 and "D" 1303, and fourth segment 1307 holds a physical path in the floorplan between "D" 1303 and "A" 1311, which is a list of physical coordinates ($x_i$, $y_i$). It is within the scope of this invention for a segment to have one or more associated cost metrics that may be utilized during synthesis and/or generation to track the cost of certain routines.

A turn, being a pair of segments, may be utilized in a manner that avoids deadlocks in a network. The network remains deadlock-free as long as no cycles exist between segments, given the allowed turn 1308, turn 1309, and turn 1310. In accordance with another aspect or embodiment of the invention, cycles may exist between the nodes. Turns have a dependency between the segments which is the basic mechanism that ensures that a network is deadlock-free. It is within the scope of this invention for cycles between nodes to exist, to reuse wire, without causing deadlocks so that only necessary channels are allocated to prevent node cycles. As a result, this eliminates unnecessary channels and reduces the associated wire cost associated therefrom.

Referring again to FIG. 13, the presence of first turn 1308 from first segment 1304 to second segment 1305 indicates that a packet may be routed from first segment 1304 to second segment 1305. The presence of second turn 1309 from second segment 1305 to third segment 1306 indicates that a packet may be routed from second segment 1305 to third segment 1306. The presence of third turn 1310 from third segment 1306 to fourth segment 1307 indicates that a packet may be routed from third segment 1306 to fourth segment 1307. In regards to segment splitting, a segment “S1” to “S2” may be split at any point ($x_i$, $y_i$) of its physical route, resulting in two new segments. This network is deadlock-free, as turn (D, A) approaches (A, B) does not exist.

Figure 14A:
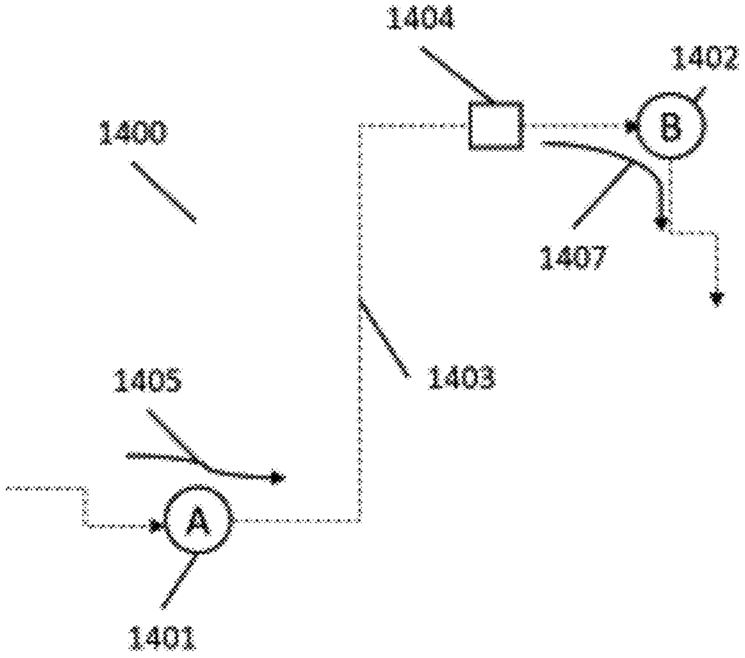
FIG. 14A illustrates a NoC topology over a floorplan having a segment "S" to "D" being split in accordance with the various aspects and embodiments of the invention.
Figure 14B:
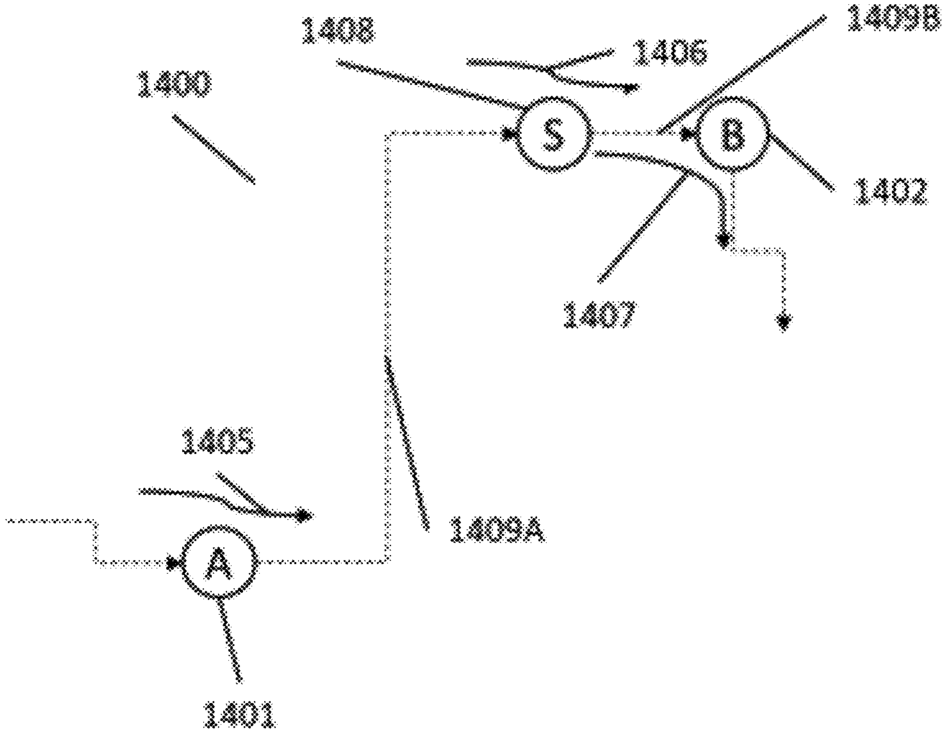
FIG. 14B illustrates a NoC topology over a floorplan having the split segment "S" to "D" updated to use two new sub-segments "S" to "N" and "N" to "D" in accordance with the various aspects and embodiments of the invention.
Figure 14C:
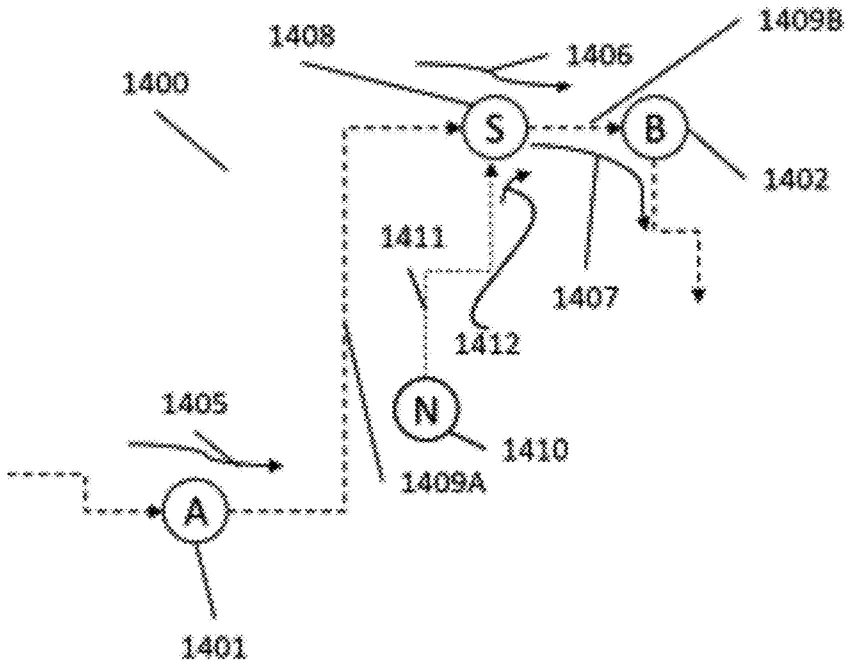
FIG. 14C illustrates a NoC topology over a floorplan having a sub-segments "N" and "S" being merged into the split segment in accordance with the various aspects and embodiments of the invention.
Figure 14D:
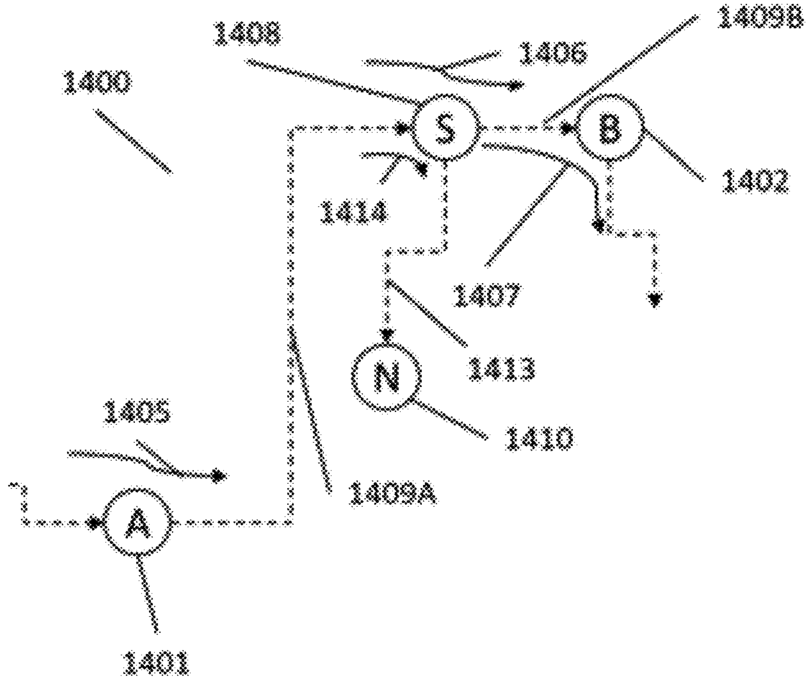
FIG. 14D illustrates a NoC topology over a floorplan having a sub-segments represented by a channel between node "N" and node "S" being forked out into the split segment in accordance with the various aspects and embodiments of the invention.

Referring now to FIGS. 14A-14D, an embodiment of segment splitting on NoC 1400 is shown. Segment 1403 (FIG. 14A) is defined by node “A” 1401 to node “B” 1402. Segment 1403 may be split 1404 (FIG. 14A) at any point (xi, yi) of its physical route into new first segment 1409A (FIGS. 14B-14D) and new second segment 1409B (FIGS. 14B-14D). FIGS. 14B-14D best depicts a result of this splitting 1404 (FIG. 14A) where newly created node “S” 1408 (FIGS. 14B-14D) is formed. First turn 1405, second turn 1406 (FIGS. 14B-14D), and third turn 1407 are shown.

FIG. 14B illustrates segment splitting of a NoC topology having the split segment “A” 1401 to “B” 1402 updated to use two new sub-segments “A” 1401 to “S” 1408 and “S” 1408 to “B” 1402. Newly created node “S” 1408 is a new switch in the NoC. The set of turns involving the split segment is updated to use the two new sub-segments. The new turn 1406 is added while preserving turn 1407.

A segment that has been split is no longer considered “as-is” because the split has resulted in sub-segments with variable routes. This recursive representation is essential for incrementality, as it ensures that segments which are part of existing routes and which may need to be split can still be recovered, as a succession of sub-segments, when re-constructing the existing routes. Splitting a segment allows the segment to be connected to a new segment. This results in a new set of turns.

FIG. 14C depicts new segment 1411 represented by a channel between node “N” 1410 and node “S” 1408 being merged into the split segment, resulting in new turn 1412.

FIG. 14D depicts new segment 1413 represented by a channel between node “N” 1410 and node “S” 1408 being forked out into the split segment, resulting in new turn 1414. The added node “N” 1410 may include, but not be limited to, an IP block and/or an initiator.

The Process

In accordance with one aspect and embodiment of the invention, the system performs the generation and synthesis process and all existing network routes are translated into segments and turns. In an embodiment, the whole NoC is described as a set of at least one segment as defined by the physical path existing between two nodes (S,D) for example. In accordance with the various aspects and embodiments of the invention, if the network is not deadlock-free, the system provides a “fail” notice and returns to the user, as the network or NoC must be initially deadlock-free in accordance with one or more aspects of the invention. The system also extract the set of connections that do not have defined routes and/or connections that need to be synthesized. Sort the extracted set of connections given a heuristic. In accordance with the various aspects and embodiments of the invention, for each connection Source “S” to Destination “D”, the single connection synthesis process involves using a configuration explorer, a configuration filtering module, a configuration selection module, splitting, creating, and route computing. Configuring, by assigning a clock domain and a data width setting, each of the newly created components, switches and links, such that the bandwidth requirements are fulfilled.

Figure 15:
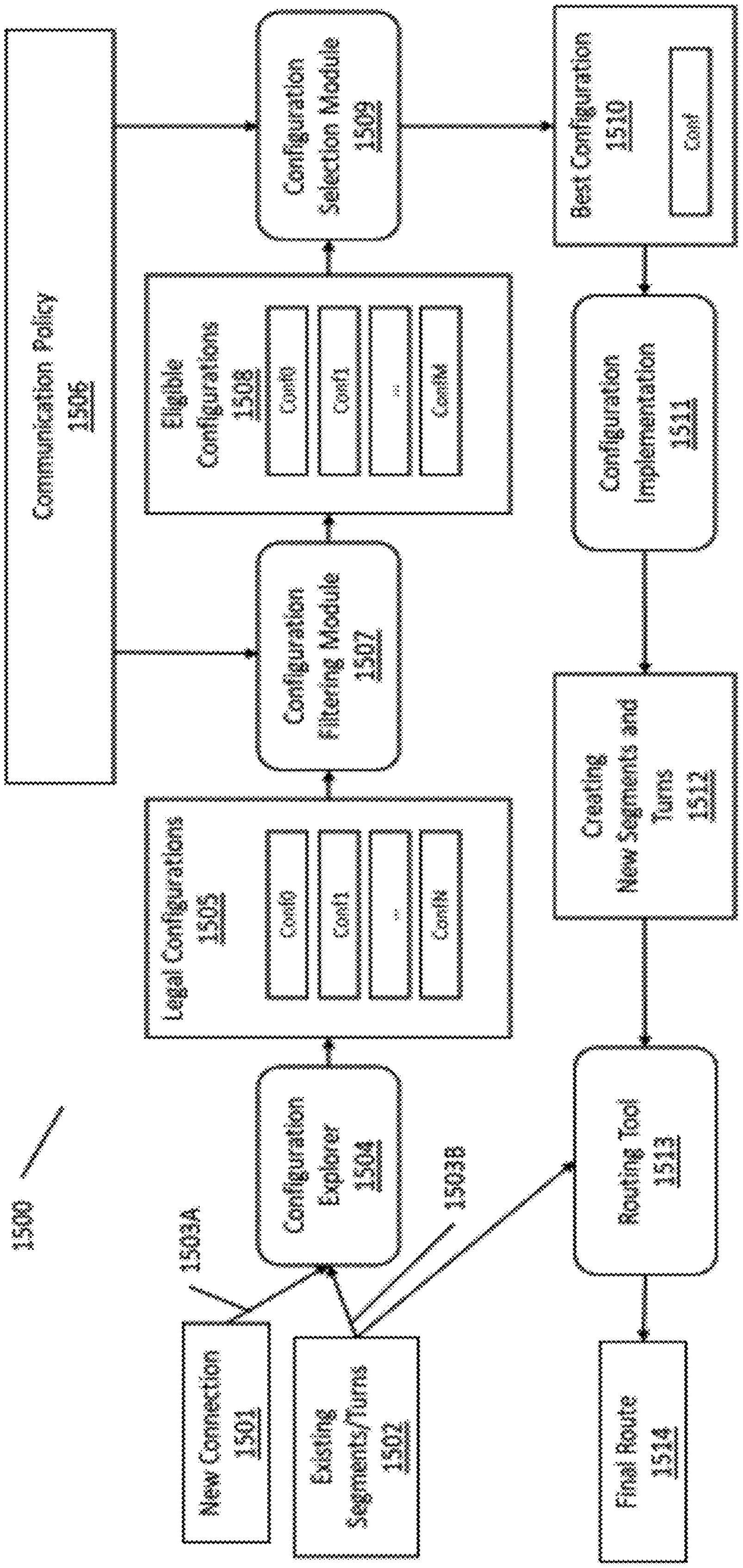
FIG. 15 is a flowchart illustrating a method for single connection NoC topology synthesis processing in accordance with the various aspects and embodiments of the invention.

FIG. 15 is a flowchart illustrating method 1500 for a NoC generator using topology synthesis processing. Input 1503A to be synthesized may be new connection 1501 and/or input 1503B may be an existing segment 1502. New connection 1501 includes of creating new components, such as switches and/or links, defining a network route from “S” to “D”. Existing segment 1502 may be re-expressed as at least one segment and/or a pair of segments having at least one turn. An existing network has a set of turns that cannot be changed. When new segments are added, turns associated with the newly added segments are added as well to complete a route from “S” to “D”. The added turns do not generate cycles and/or deadlocks with existing turns.

Configuration explorer 1504 receives input 1503A being new connection 1501 and input 1503B being existing segment 1502. Since there are a plurality of ways to connect to a segment “S” to “D”, configuration explorer 1504 influences the best configuration based on each segment being assigned communication policy 1506. Configuration explorer 1504 explores different ways to connect “S” to “D” using exploration of legal configurations 1505. Legal configurations 1505 are a list of described parameters. Configuration explorer 1504 is configured to explore and/or review and analyze at least one configuration of possibilities indicating a location, traversing the segment, to split a segment from a list of meaningful configurations stored in memory. Configuration explorer 1504 may have a configuration with a new entry segment for connecting “S” to some segment of the NoC. If “S” is already connected, it already has an entry segment. Configuration explorer 1504 may have a configuration with a new exit segment for connecting.

The cost of a given path is updated at each step according to communication policy 1506. In an example, moving within an existing segment away from the destination may have more or less cost than creating a new segment that directly reaches the destination depending on whether communication policy 1506 favors wire length and/or latency. It is within the scope of this invention for a well-established, shortest path algorithm to explore both concrete segments and identify potential future segments, using the cost updates as a way to effectively implement several communication policies.

The main configuration exploration process 1504 may be designed as specialized version of a common shortest-path algorithm including, but not limited to, A* and/or Dijkstra. A given step in the shortest path algorithm considers the different points that can be reached from the current point. The current point is at least one point along the physical path of an existing segment. The path from the current point in the current segment to a subsequent point is subject to considerations.

In an embodiment, the path may advance one step along the current segment’s path. In an embodiment, if the end of the segment’s path has been reached, the path may advance to the first point in the path of any of the next segments, such as segments that are directly connected to the current segment, and which the current segment is capable to “turn” to.

In an embodiment, if the destination is not connected, such as if no exit segment exists, the path may jump directly to the destination point. This corresponds to creating a new exit segment. The new and/or future exit segment is then added to the configuration.

In yet another embodiment, the path may jump to any point of any segment, as long as no cyclic-dependencies are created, the two segments have compatible communication policies, and the communication policy allows merging. This corresponds to creating a new internal segment, which is added to the configuration.

Referring again to FIG. 15, configuration filtering module 1507 has a predetermined listing containing data including, but not limited to, which configurations are legal, which configurations result in deadlocks, which configurations are not optimal. Configuration filtering module 1507 filters configurations given multiple criteria including, but not limited to, communication policy 1506 based criteria and/or any custom criteria and only keeps a sub-set. In an example of custom criteria, a user such, as a programmer, may base the parameters on low latency defined by a shorter length between the route from "S" to "D". The user may define a maximum length of a path. Configuration filtering module 1507 of communication policy 1506 will remove a route if the length of the path exceeds the user defined threshold. In another example, the parameters may be based on the use of a minimum number of extra wires. In another example, a parameter may be based on a cost function that favors a route from "S" to "D" having the lowest cost. Configuration filtering module 1507 is customizable to user predefined parameters. A user may set their own filters and discard certain types of configurations.

The first criteria is communication policy 1506 based criteria. A user may control the way in which new segments are created. Communication policy 1506 is a set of parameters that may be associated with any given connection in the network. The system may have a plurality of communication policies defined and each connection may be associated with one communication policy 1506. Communication policy 1506 has parameters and flags. In an example of a flag, low latency is when a connection should be implemented in a way that minimizes the total path length from source to destination. In another example of a flag, enable serialization is when the links involved in the path from source to destination are allowed to employ serialization to save wire. Some configurations for a given connection may not be legal with respect to communication policy 1506 governing the connection. Eligible configurations 1508 are a filtered version of legal configurations. In an example, if connection "S" to "D" is set to have a low latency communication policy, then a limit on the total length of the route and the number of hops or traversed components must be applied and configuration candidates that do not fall within these limits are discarded.

Referring again to FIG. 15, after filtering, configuration filtering module 1507 outputs eligible configurations 1508. It is desirable to select one eligible configuration performed by configuration selection module 1509. Selecting the best configuration is achieved using configuration selection module 1509, which retains only one final configuration to be implemented as the final synthesis of connection "S" to "D". The metric used to select a best configuration is configurable and may take several parameters into account, based on community policy 1506. In an embodiment, a communication policy parameter is total additional wire-length The length of extra created segments creates wire needed to traverse a route. There are costs associated with wire. It would be more desirable for a parameter to be aimed at minimizing the total wire length to reduce the cost of topology. In an embodiment, a communication policy parameter is total route length. The total length of the route is the combination of the total of existing segments plus the newly added segments. This parameter is focused on minimizing the latency. In another embodiment, a communication policy parameter is based on bandwidth distribution. This parameter optimizes performance by focusing on traffic distribution and the associated level of congestion on the segments.

Once best configuration 1510 is selected, the system will implement 1511 best configuration 1510 by splitting the segments involved and creating 1512 new segments and turns and apply it to the network. It is within the scope of this invention for the best configuration to be the final configuration. When a segment is split, it is split at all the existing segments that need to be connected to new segments at the points dictated by the chosen configuration. In regards to optimization, if the splitting point is within a certain distance from one of the segment's endpoints, and the endpoint is a switch, then the endpoint shall be reused for the connection instead of creating a new switch. This can reduce the number of created switches. Creating 1512 the required new segments dictated by the chosen configuration and activate the corresponding turns. The newly created 1512 segments and turns in combination with existing 1502 segments and turns are input into routing tool 1513 that generates final route 1514. The route is computed from "S" to "D" given the newly created segments. The route is stored in memory. Routing tool 1513 is routing connections on the geographical floorplan because the segment is defined in terms of its geographical path following the floorplan.

Figure 16A:
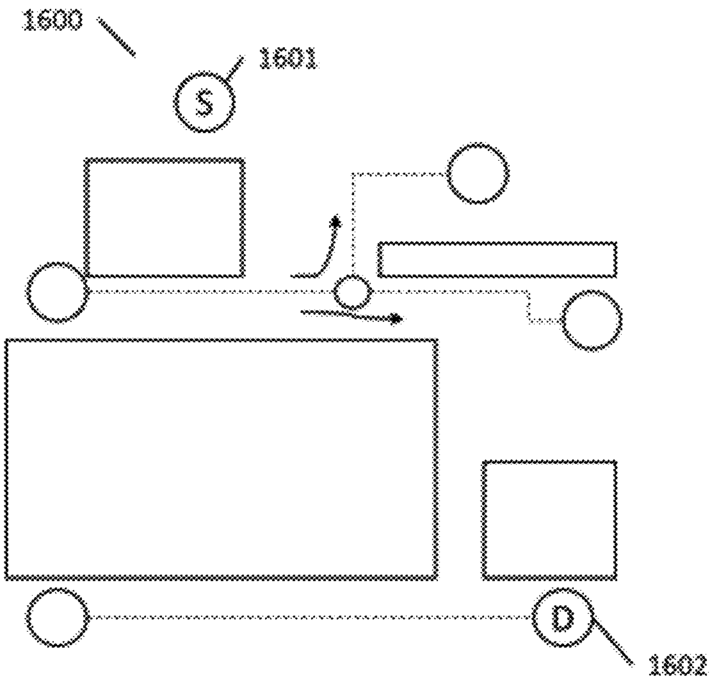
FIG. 16A illustrates a NoC topology over a floorplan having request for connecting node "S" to node "D" in accordance with the various aspects and embodiments of the invention.

FIG. 16A illustrates a NoC topology over a floorplan having a node "S" 1601 to node "D" 1602. If there is an existing network and a change is requested such as, a request for adding a new connection from node "S" 1601 to node "D" 1602 an incremental synthesis will need to be performed. IP blocks are an example of restrictions on the floorplan that a route needs to navigate around. Existing nodes are connected to each other. It is desirable to create a route, for a new connection, in the existing network without having to make changes to the existing structures.

Figure 16B:
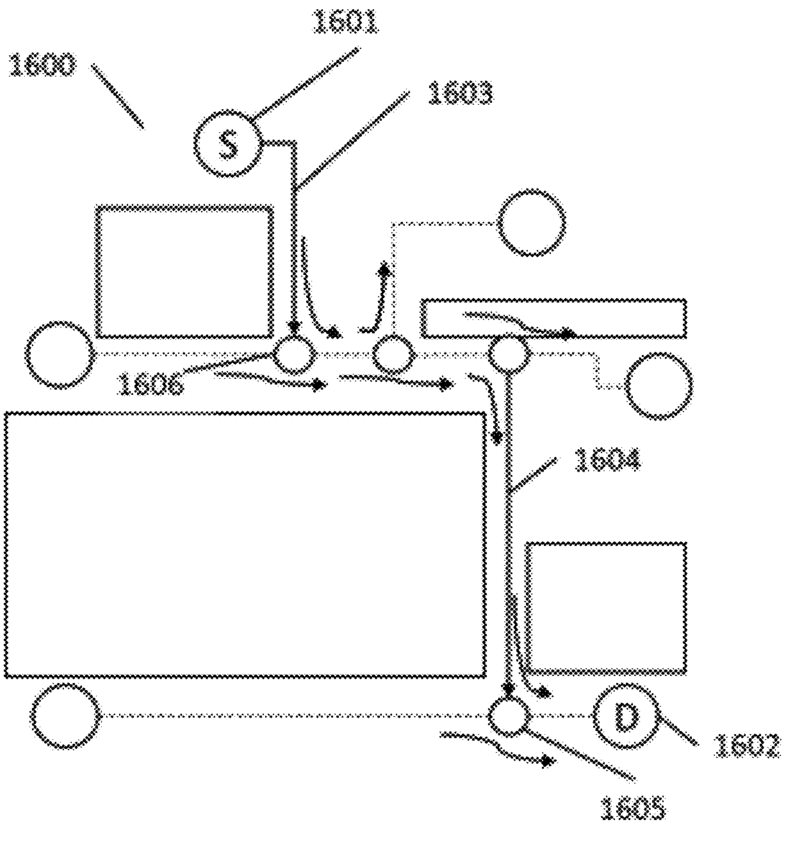
FIG. 16B illustrates a NoC topology over a floorplan having an incremental synthesis result of a routing configuration from "S" to "D" with a new entry segment, a new internal segment, and an existing exit segment in accordance with the various aspects and embodiments of the invention.

FIG. 16B illustrates a NoC topology over a floorplan having an incremental synthesis result of a routing configuration from "S" 1601 to "D" 1602 with new entry segment 1603 having node "S" 1601 and node 1606, new internal segment 1604 having node, and exit segment 1605. The exploration of legal configurations 1505 is shown in a configuration illustrated in FIG. 16B, where entry segment 1603 is added if the node is not already connected to the NoC. In an embodiment, new entry segment 1603 is capable of connecting "S" 1601 to a segment of the NoC. If "S" 1601 is already connected to a segment of the NoC, it already has an entry segment.

In the illustration of FIG. 16B, exit segment 1605 was existing because "D" was already connected to another node. So, if "D" is already connected, it already has an exit segment. A new exit segment may be a configuration option for connecting some segment of the NoC to "D".

Referring again to FIG. 16B, it is within the scope of this invention for there to be any number of internal segments 1604. At least one and/or a plurality of new internal segments may connect existing segments in such a way that the entry segment reached the exit segment. A connection between two existing segments is considered only if it does not create a cyclic dependency between the segments, ensuring only deadlock-free configurations are considered. The synthesis may include in computing a network route, without creating any new switches and/or segments. This is the case if "S" and "D" are both connected to the network and the entry segment can already reach the exit segment given only the existing turns. It is an important aspect of this invention that the configuration may define future segments, whereby, no concrete segments are created in the topology during the exploration phase.

In an embodiment, the system may pre-set a number of common communication policies to make the choice easier for a user. It is more desirable for a user to pick from a list of presets instead of requiring a user to create a communication policy. Connections that are associated with different communication policies will have synthesized routes that are physically separated. During synthesis, configuration filtering module 1507 (FIG. 15) and configuration selection module 1509 (FIG. 15) rely on communication policy 1506 (FIG. 15) to output best configuration 1510 for implementing 1511 a route.

Figure 17A:
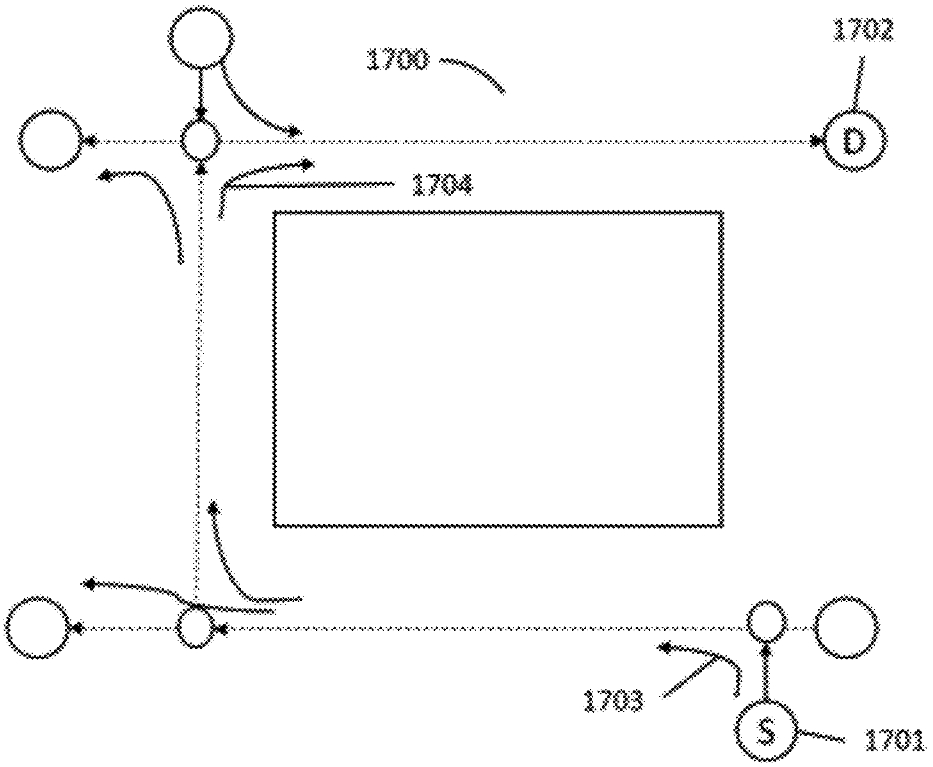
FIG. 17A illustrates a NoC topology over a floorplan having a communication policy 1700 being to optimize wire length with a best effort performance in accordance with the various aspects and embodiments of the invention.
Figure 17B:
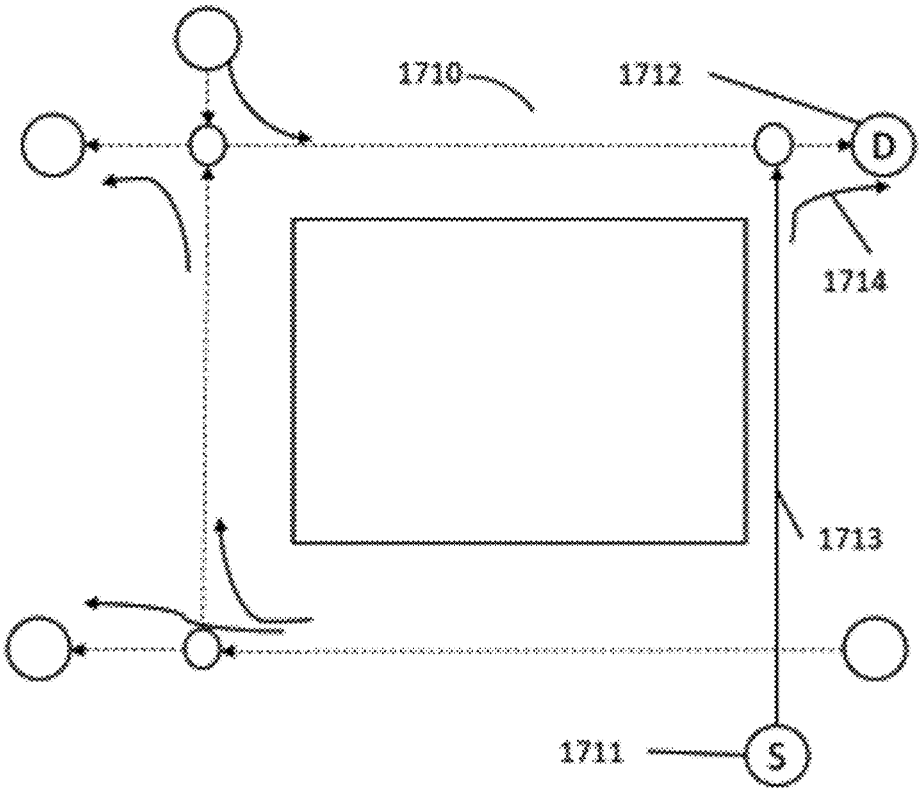
FIG. 17B illustrates a NoC topology over a floorplan having a communication policy 1710 being to a low latency communication in accordance with the various aspects and embodiments of the invention.

FIG. 17A illustrates a NoC topology over a floorplan having communication policy 1700 being to optimize wire length with a best effort performance. FIGS. 17A and 17B show how the same connection may lead to different implementations based on the chosen communication policy. In the illustration of FIG. 17A, the focus is to connect node "S" to node "D" and the parameter for the wire length is the main criterion of optimization. The configuration selection module selects an implementation that creates minimum extra wire. It is shown that having short entry segment 1703 and one turn activated 1704 meets the parameter requirements.

FIG. 17B illustrates a NoC topology over a floorplan having communication policy 1710 being to a low latency communication. In this example, there is a direct connection 1713 preference between node "S" 1711 and node "D" 1712 rather than traversing several switchers. One turn activated 1714 is near "D". Although this configuration crates more extra wires and is more costly, it is the user selected path from "S" to "D" having the shortest length.

The basic method for incrementally synthesizing new connections while reusing existing segments is best shown in FIGS. 1-17B. This embodiment relies on splitting existing segments to fork out new segments. At the end of the process, only the newly created components are configured such as, a clock and/or data width, and the existing components are left unaltered. Referring again to FIG. 15, existing segments and turns 1502 are altered by user control at incrementality levels. A user utilizes communication policy 1506 to control the creation and selection of not only the new segments in a network, but also to modify the existing topology or segments. In an example, reusing an existing segment in new routes may not be desirable due to performance considerations or to previous optimizations that a user may have implemented and that depend upon the segment remaining unaltered. When a segment is split, a hop may be added to traverse a plurality of routes, which may not be the desired outcome. As a result, the system defines a number of incrementality levels, or modes, that are based on physical mutability of segments, physical mutability of switches, and logical mutability of network elements. It is more desirable to capture a user's intent when synthesizing a set of new connections in the presence of an existing NoC topology.

In an alternate embodiment, incremental synthesis modes allow a user to customize how the existing topology is altered.

In regards to physical mutability of segments, a segment is mutable by default. The segment may be split to fork-out a new segment. A user may make a segment immutable if, for example, it is not desired to have a switch added to an existing route.

Referring to physical mutability of switches, a new segment may be connected to an existing endpoint of an immutable segment if the endpoint is a switch. If it is not desired to modify the physical size of the switch, then the switch may be immutable so that no new segments can be connected to the immutable switch.

Referring now to logical mutability of network elements, as a default, existing network elements including, but not limited to, data width and/or an assigned clock, are not reconfigured by the incremental synthesis process. Only newly created switches and adapters are configured. This may lead to inefficient configurations such as insufficient bandwidth and/or too many clock domain crossings. Any component may be marked as logically mutable to allow existing components to be reconfigured given new resulting topology. In an example of how preset incremental synthesis modes can be defined in the system based on the aforementioned concepts, three preset modes are discussed.

Figure 18A:
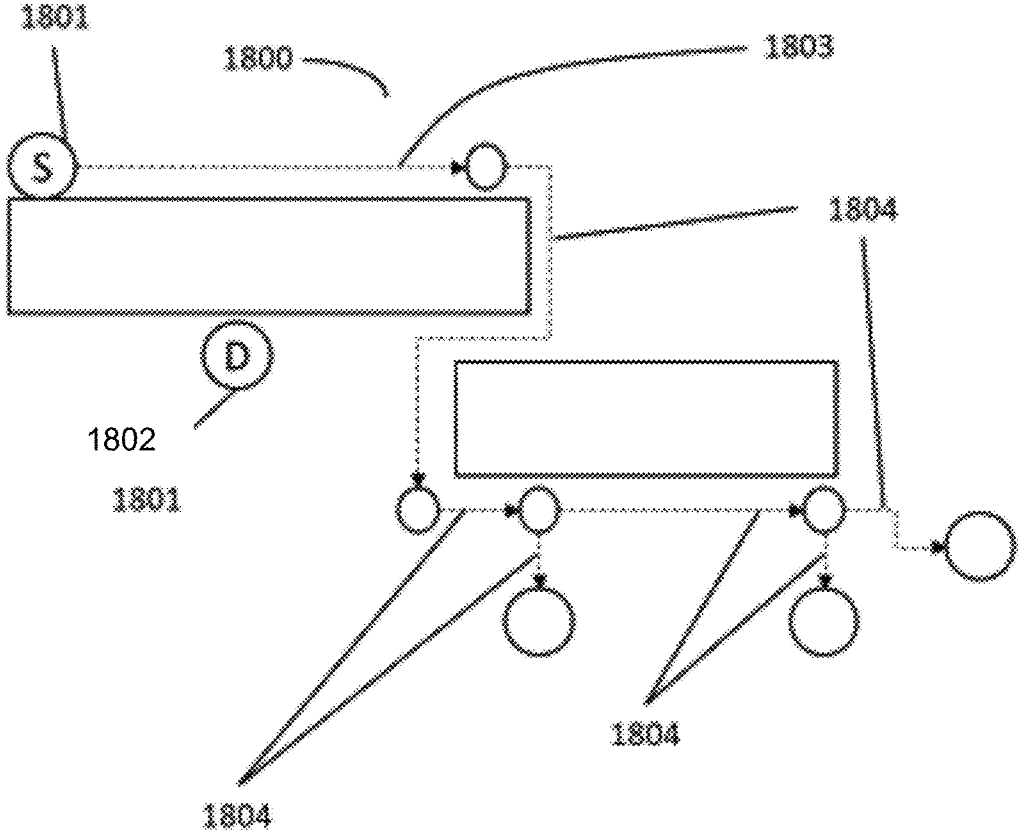
FIG. 18A illustrates an incremental synthesis mode 1800 for initial setup of segments being connected from node "S" to node "D" in accordance with the various aspects and embodiments of the invention.

FIG. 18A illustrates an incremental synthesis mode 1800 for initial setup of segments being connected from node "S" 1801 to node "D" 1802. High bandwidth segments 1803 and low bandwidth segments 1804 traverse the existing NoC topology route. During initial setup, user parameters will determine how existing topology is altered to connect "S" 1801 to "D" 1802.

Figure 18B:
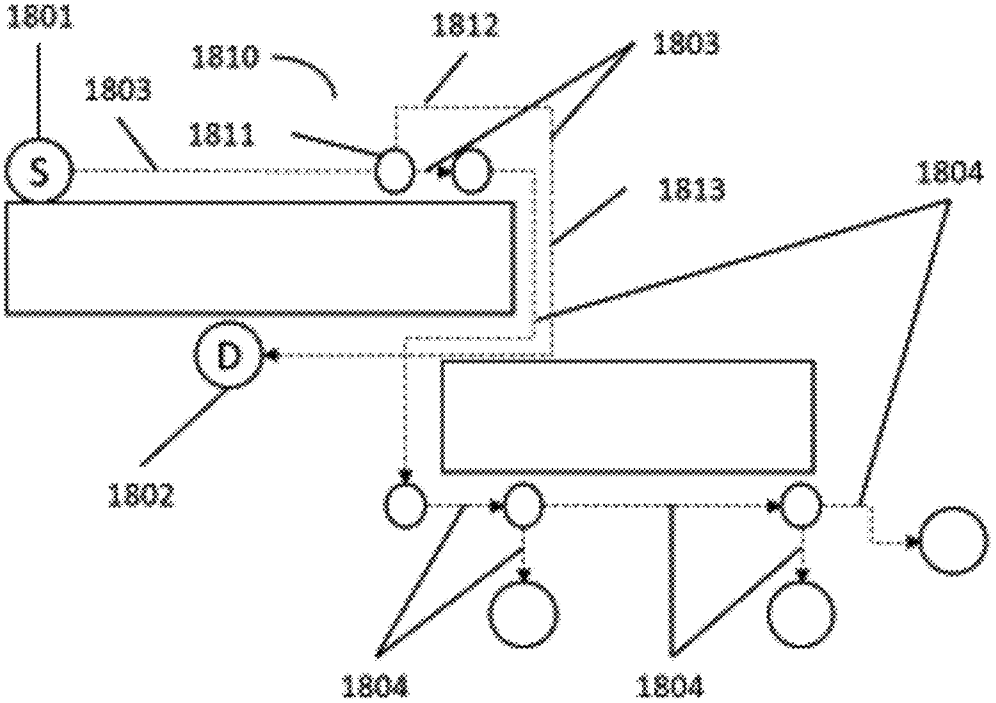
FIG. 18B illustrates an incremental synthesis mode 1810 for physical immutability of segments having a parameter being minimal change in accordance with the various aspects and embodiments of the invention.

FIG. 18B illustrates an incremental synthesis mode 1810 for physical immutability of segments having a parameter being minimal change. The segment is split 1811 to fork-out 1812 a new segment and a U-turn is created in a deadlock-free network to connect "S" 1801 to "D" 1802 with minimal change. High bandwidth segments 1803 are unaltered to prevent splitting and low bandwidth segments 1804 traverse are routed around the existing NoC topology route.

It is more desirable to preserve the greatest amount of existing topology. All segments are made physically immutable with the exception entry and exit segments because entry and exit segments are needed for implementing new connections. All switches are physically immutable and all the network elements are logically immutable. In an example, if one segment from "S" 1801 to "D" 1802 is marked immutable, and it will prevent splitting of the segment and facilitate a route around an existing segment. As a result, the existing segment remains unchanged.

Figure 18C:
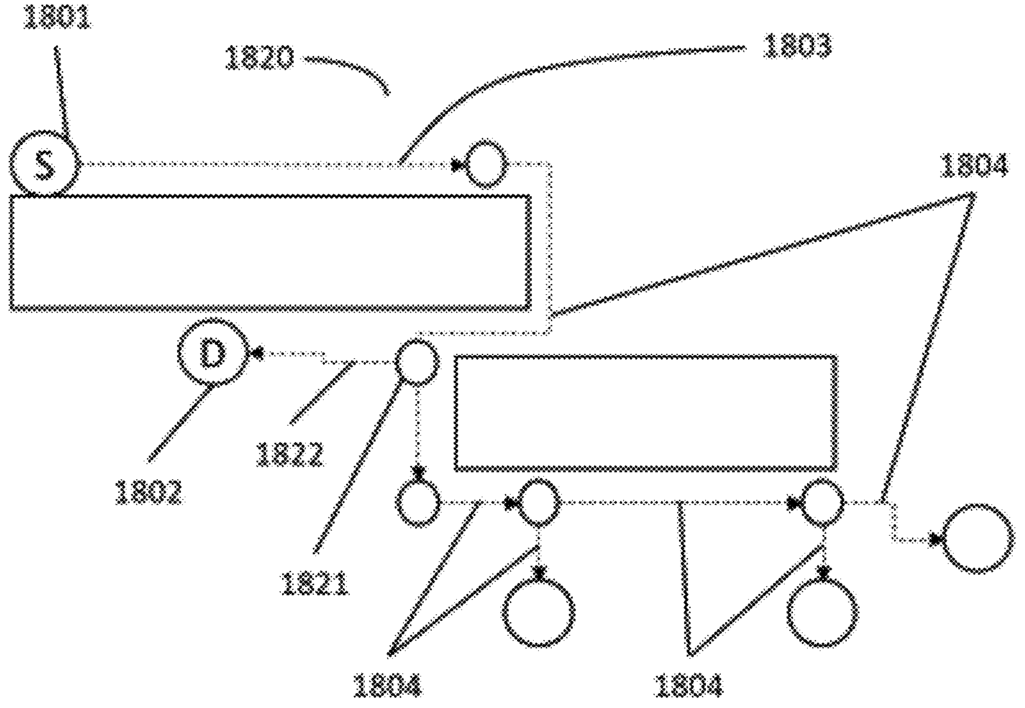
FIG. 18C illustrates an incremental synthesis mode 1820 for logical immutability of segments having a parameter being optimize topology and preserve configuration in accordance with the various aspects and embodiments of the invention.

FIG. 18C illustrates an incremental synthesis mode 1820 for logical immutability of segments having a parameter being optimize topology and preserve configuration. Low bandwidth 1804 segment was split 1821 and forked-out new segment 1822, and a new turn was created to connect "S" 1801 to "D" 1802. High bandwidth is not fully utilized because it was connected to a lower bandwidth and the switches cannot be changed. It would be more desirable for some switches to be changed to adapt. This preset allows for existing segments to be split and for switches to have new connections for more optimized topologies. As a result, a better cost through the reuse of existing elements may be achieved. Existing network elements may be made logically immutable to maintain, for example, a clock frequency, a clock assigned to a switch, and/or other attributes unchanged.

Figure 18D:
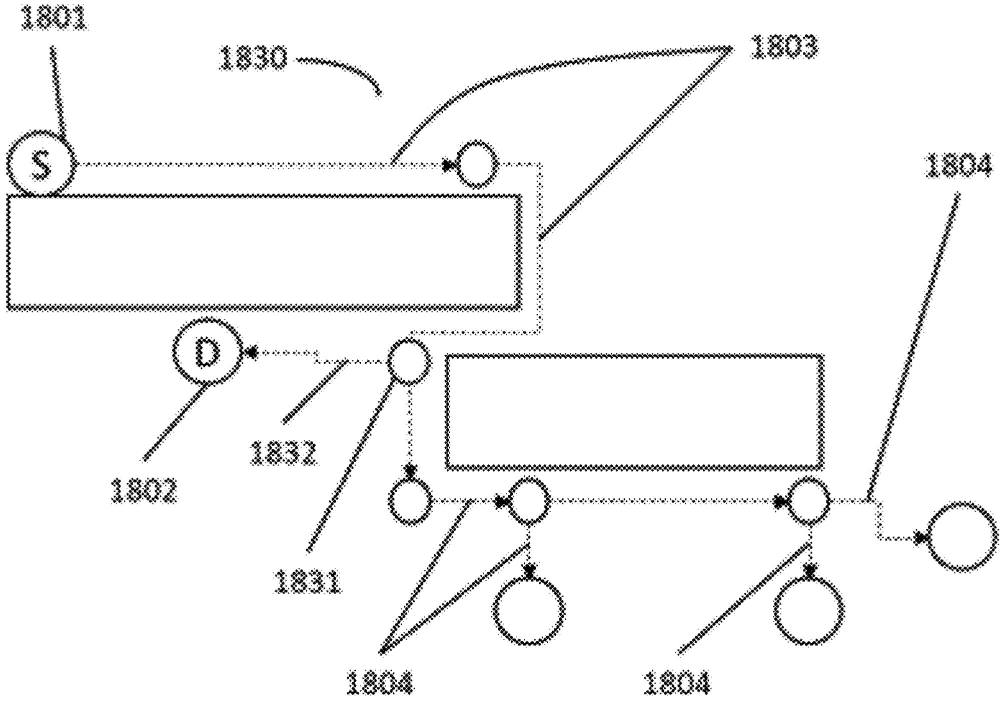
FIG. 18D illustrates an incremental synthesis mode 1830 for mutability of network elements having a parameter being optimize topology and adapt configuration in accordance with the various aspects and embodiments of the invention.

FIG. 18D illustrates an incremental synthesis mode 1830 for mutability of network elements having a parameter being optimize topology and adapt configuration. High bandwidth 1803 segment was split 1831 and forked-out new segment 1832, and a new turn was created to connect "S" 1801 to "D" 1802. High bandwidth is fully utilized because it was connected to a higher bandwidth because the switches were changed. More flexibility to the synthesis process is achieved when all segments can be split, switches can be connected to new segments, and/or components can be reconfigured if reconfiguring them improves the result, for example, when changing the clock to improve performance.

Figure 19:
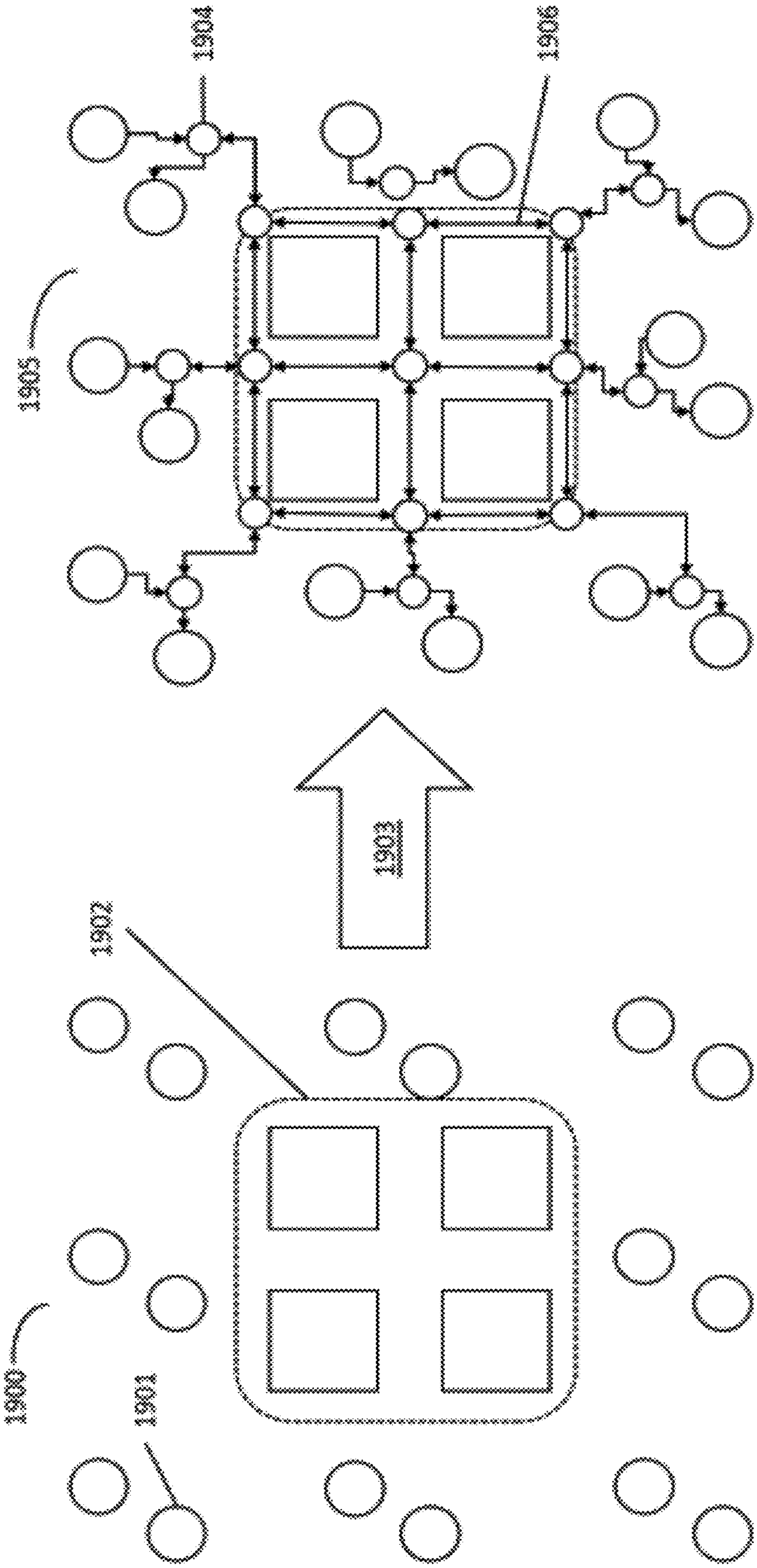
FIG. 19 illustrates a process of NoC synthesis based on a mesh custom subnetwork description in accordance with the various aspects and embodiments of the invention.

FIG. 19 illustrates a process of NoC synthesis based on a mesh custom subnetwork description. First, mesh segments are generated and physically placed optimally on the requested space. Second, the new mesh segments, now considered as pre-existing segments by the incremental synthesis process are used opportunistically when appropriate to generate the final routes. The result is a topology mixing an automatically generated regular mesh topology with new optimally synthesized segments. In a fully connected system NoC 1900 has each node 1901 connecting to every other node. Region 1902 is specified for a 3×3 mesh using an XY routing algorithm. As a result of the synthesis process 1903, NoC 1905 uses requested mesh segments and newly synthesized segments. Automatically synthesized local trees 1904 are shown. Mesh is generated and optimally placed within specified region 1906.

In accordance with other aspects of the invention, extension of clock and power domains on the floorplan are provided and each element is tested to ensure it is located within the bounds of the specified clock and power domain. If the test fails, the element is moved until a suitable location is found where the test is passing. Once a suitable placement has been found for each element, a routing is done of each connection between element. The routing process will find a suitable path for the set of wires making the connections between elements. After routing is done, distance-spanning pipeline elements are inserted on the links if required, using the information provided regarding the capabilities of the technology, based on how long it takes for a signal to cover a 1 mm distance.

In accordance with some aspects and embodiments of the invention, the tool generates one or more computer files describing the generated NoC that includes:

- The list of network elements with their configuration: data width, clock domain.
- The position of each generated network element on the floorplan.
- The set of routes through the network elements implementing the connectivity.

In accordance with the aspects of the invention, a route is an ordered list of network elements, one for each pair of (initiator, target) and one for each pair of (target, initiator). The route represents how traffic between the pairs will flow and through which elements.

In accordance with various aspects of the invention, the tool is used to generate metrics about the generated NoC, such as: histograms of wire length distribution, number of switches, histogram of switch by size.

In accordance with another aspect of the invention, the tool automatically inserts in the network various adapters and buffers. The tool inserts the adapters based on the adaptation required between two elements that have different data width, different clock and power domains. The tool inserts the buffers based on the scenarios and the detected rate mismatch.

In accordance with some aspects and embodiments, the tool can be used to ensure multiple iterations of the synthesis are done for incremental optimization of the NoC, which includes a situation when one constraint provided to the tool is information about the previous run.

After execution of the synthesis process by the software, the results are produced in a machine-readable form, such as computer files using a well-defined format to capture information. An example of such a format is XML, another example of such a format is JSON. The scope of the invention is not limited by the specific format.

Some aspects of the invention employ an incremental approach to network synthesis. This incremental approach is useful in numerous contexts. For instance, in some embodiments, the incremental process begins from a specification and a clean floorplan. In these and other embodiments, some of which were discussed above, In accordance with some aspects and embodiments, connections can have a communication policy, which specifies, for example, a connection's sensitivity to latency.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code including instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example, and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WIFI, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media including any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A method for generating a deadlock free network-on-chip (NoC), the method comprising:

generating a new NoC configuration by synthesizing at least a first new connection into an existing deadlock-free NoC configuration; and generating a first new deadlock-free route from a source to a destination using existing routes and adding new connections, including:

translating, for each existing route in the existing deadlock-free NoC configuration, the existing routes into segments and turns;

identifying one or more of the new connections, which are to be synthesized based on a synthesis order;

identifying, for each of the new connections and in accordance with the synthesis order, a plurality of possible routes from the source to the destination for one or more of the new connections, wherein the plurality of possible routes are eligible routes that avoid deadlock; and filtering at least one of the plurality of possible routes based on a criteria to identify the first new deadlock-free route.

2. The method of claim 1, wherein the first new deadlock-free route includes at least one of an existing physical segment and a new physical segment.

3. A method for synthesis of a network-on-chip (NoC) topology, the method comprising:

receiving the NoC topology as an input;

reusing an existing segment that is within the NoC topology in a new route, wherein the existing segment is formed by a path between a first node and a second node;

splitting the existing segment recursively at any geographical point along the path to form a split segment;

synthesizing the new route by adding a new segment and a new turn to the split segment, wherein the new segment and the new turn avoid cyclic dependencies to ensure a deadlock-free segment; and generating a deadlock-free NoC topology by routing a packet using the new route, from the existing segment to the new segment the deadlock-free NoC topology.

4. The method of claim 3 further comprising translating the NoC topology into an existing segment and existing turns.

5. A non-transitory computer readable medium for storing code, which when executed by one or more processors, would cause the one or more processors to:

receive an input topology of a network-on-chip (NoC);

determine a source-destination pair in the input topology to be selected for synthesis and at least one existing connection between the source-destination pair;

transcribe the source-destination pair into a plurality of segments;

transcribe the at least one existing connection into a plurality of existing segments;

determine if the NoC is deadlock-free by analyzing the plurality of segments to identify if there are any deadlocks;

extract, in response to determining that the NoC is deadlock-free, a pair of segments from the plurality of segments that do not have defined routes and sort using a heuristic;

input the plurality of segments and the plurality of existing segments into a configuration explorer;

output, using a configuration filtering module in communication with the configuration explorer, eligible configurations based on the plurality of segments and the plurality of existing segments that satisfy a communication policy;

select, using a configuration selection module in communication with the configuration filtering module, a final configuration from the eligible configurations that is to be implemented for connecting the source-destination pair, wherein the final configuration includes at least one segment selected from the plurality of segments;

split at least one existing segment selected from the plurality of existing segments that needs to be connected to the at least one segment at a point based on the final configuration;

activate corresponding turns connecting the at least one existing segment with the at least one segment; and compute a route for the source-destination pair using the corresponding turns connecting the at least one existing segment with the at least one segment.

* * * * *